United States Patent
Ueno et al.

(10) Patent No.: US 9,552,657 B2
(45) Date of Patent: Jan. 24, 2017

(54) MOBILE ELECTRONIC DEVICE AND CONTROL METHOD OF MOBILE ELECTRONIC DEVICE

(75) Inventors: Yasuhiro Ueno, Yokohama (JP); Shigeki Tanabe, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 142 days.

(21) Appl. No.: 13/819,649

(22) PCT Filed: Aug. 19, 2011

(86) PCT No.: PCT/JP2011/068796
§ 371 (c)(1),
(2), (4) Date: Feb. 27, 2013

(87) PCT Pub. No.: WO2012/026406
PCT Pub. Date: Mar. 1, 2012

(65) Prior Publication Data
US 2013/0169678 A1    Jul. 4, 2013

(30) Foreign Application Priority Data

Aug. 27, 2010  (JP) ................. 2010-191459
Aug. 27, 2010  (JP) ................. 2010-191460
Aug. 27, 2010  (JP) ................. 2010-191461

(51) Int. Cl.
*G09G 5/00* (2006.01)
*G06T 11/00* (2006.01)
(Continued)

(52) U.S. Cl.
CPC ......... *G06T 11/003* (2013.01); *G06K 9/00476* (2013.01); *G09B 29/106* (2013.01);
(Continued)

(58) Field of Classification Search
CPC ................................. G09G 2340/12
(Continued)

(56) References Cited

U.S. PATENT DOCUMENTS 5,862,498 A * 1/1999 Koyanagi et al. ............. 701/28
6,184,823 B1 * 2/2001 Smith .................... G01C 21/32
                                                  342/357.31
(Continued)

FOREIGN PATENT DOCUMENTS

JP       11-282343 A      10/1999
JP      2001-211372 A      8/2001
(Continued)

OTHER PUBLICATIONS

Schöning et al. (Map Torchlight: A Mobile Augmented Reality Camera Projector Unit, 2009).*
(Continued)

*Primary Examiner* — Kyle Zhai
(74) *Attorney, Agent, or Firm* — Hauptman Ham, LLP

(57) ABSTRACT

According to an aspect, a mobile electronic device includes: an imaging unit for capturing a map image; a processing unit for acquiring information for a specific image corresponding to the map image based on information included in the map image captured by the imaging unit; and an image projecting unit for projecting the specific image to a projection area.

23 Claims, 21 Drawing Sheets

(51) Int. Cl.
*H04M 1/02* (2006.01)
*H04M 1/725* (2006.01)
*H04N 9/31* (2006.01)
*H04N 7/18* (2006.01)
*G06K 9/00* (2006.01)
*G09B 29/10* (2006.01)

(52) U.S. Cl.
CPC ..... *H04M 1/0272* (2013.01); *H04M 1/72522* (2013.01); *H04N 7/183* (2013.01); *H04N 9/3173* (2013.01); *H04N 9/3194* (2013.01); *H04M 2250/52* (2013.01)

(58) Field of Classification Search
USPC .......................................................... 345/629
See application file for complete search history.

(56) References Cited

U.S. PATENT DOCUMENTS

| | | | |
|---|---|---|---|
| 7,164,811 | B2 | 1/2007 | Nathanson et al. |
| 2008/0304018 | A1* | 12/2008 | Tanis-Likkel ......... G03B 21/26 353/30 |
| 2009/0152348 | A1* | 6/2009 | Ostrowski et al. .......... 235/383 |
| 2010/0099464 | A1* | 4/2010 | Kim .............................. 455/566 |
| 2010/0153000 | A1* | 6/2010 | Akita et al. ................... 701/201 |
| 2010/0168997 | A1* | 7/2010 | Sakamoto ............. G09B 29/10 701/532 |
| 2011/0102605 | A1* | 5/2011 | Hannaford ................ 348/207.1 |

FOREIGN PATENT DOCUMENTS

| | | |
|---|---|---|
| JP | 2005-227374 A | 8/2005 |
| JP | 2006-101013 A | 4/2006 |
| JP | 2007-096542 A | 4/2007 |
| JP | 2007-527159 A | 9/2007 |
| JP | 2009133775 A | 6/2009 |
| JP | 2010-117291 A | 5/2010 |

OTHER PUBLICATIONS

Rohs et al. (Map Navigation with Mobile Devices: Virtual versus Physical Movement with and without Visual Context, Nov. 12-15, 2007 ACM, pp. 146-153).*

Schöning et al. (Interaction of mobile camera devices with physical maps, 2006, Adjunct Proceeding of the Fourth International Conference).*

Shackelford et al. (Fully Automated Road Network Extraction from High-Resolution Satellite Multispectral Imagery, IEEE, 2003).*

Doucette et al. (Automated Road Extraction from High Resolution Multispectral Imagery, American Society for Photogrammetry and Remote sensing, 2004).*

Office Action mailed Jul. 29, 2014, corresponding to Japanese patent application No. 2010-191461, for which an explanation of relevance is attached.

International Search Report and Written Opinion corresponding to PCT/JP2011/068796, dated Dec. 6, 2011.

* cited by examiner

FIG.10
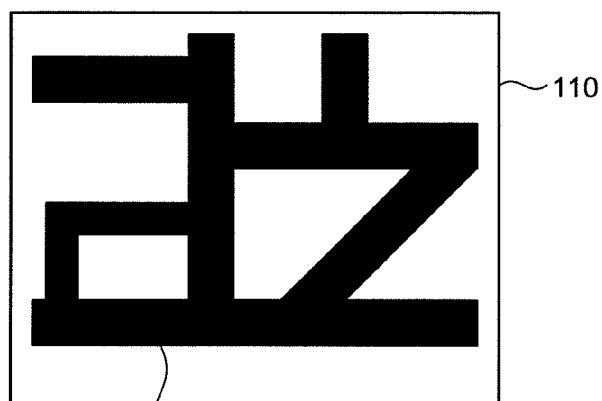
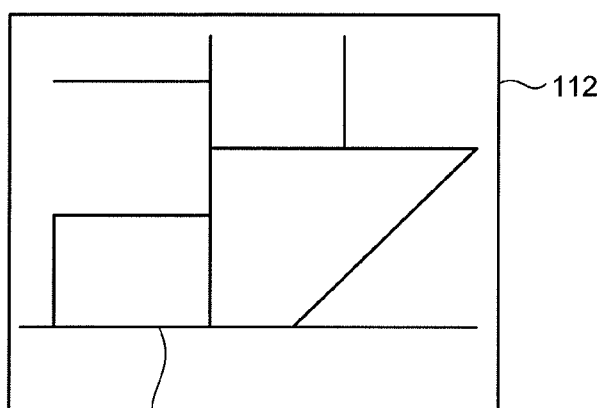
FIG.11
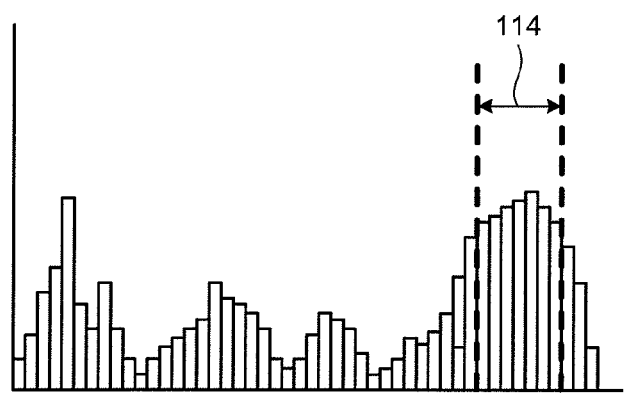
COLOR HISTOGRAM

FIG.13

| Index | Number of Blanches | Connected Index | Coordinates (X,Y) |
|---|---|---|---|
| 1 | 3 | 2, 4 | (10,80) |
| 2 | 3 | 1, 3, 5 | (45,80) |
| 3 | 3 | 2, 8 | (65,80) |
| 4 | 2 | 1, 5 | (10,45) |
| 5 | 3 | 2, 4, 6 | (45,45) |
| 6 | 3 | 5, 7, 9 | (45,30) |
| 7 | 3 | 6, 8 | (75,45) |
| 8 | 2 | 3, 7 | (105,45) |
| 9 | 3 | 6 | (45,15) |

FIG.15

| Index | Number of Blanches | Connected Index | Coordinates (Latitude, Longitude) |
|---|---|---|---|
| 1 | 3 | 2, 4 | (35.668244, 139.668760) |
| 2 | 3 | 1, 3, 5 | (35.668244, 139.672880) |
| 3 | 3 | 2, 8 | (35.668244, 139.675025) |
| 4 | 2 | 1, 5 | (35.670266, 139.669361) |
| 5 | 3 | 2, 4, 6 | (35.670266, 139.672536) |
| 6 | 3 | 5, 7, 9 | (35.671382, 139.672536) |
| 7 | 3 | 6, 8 | (35.671382, 139.675111) |
| 8 | 2 | 3, 7 | (35.671382, 139.679231) |
| 9 | 3 | 6 | (35.671940, 139.672536) |
| 10 | 2 | 3 | (35.668244, 139.684038) |
| 11 | 2 | 7, 12 | (35.674798, 139.675111) |
| 12 | 3 | 9, 11 | (35.671940, 139.675111) |

FIG.16

| Index | Number of Blanches | Connected Index | Coordinates (X,Y) | Coordinates (Latitude, Longitude) | |
|---|---|---|---|---|---|
| 1 | 3 | 2, 4 | (10,80) | (35.668244,139.668760) | ~150 |
| 2 | 3 | 1, 3, 5 | (45,80) | (35.668244,139.672880) | |
| 3 | 3 | 2, 8 | (65,80) | (35.668244,139.675025) | |
| 4 | 2 | 1, 5 | (10,45) | (35.670266, 139.669361) | |
| 5 | 3 | 2, 4, 6 | (45,45) | (35.670266,139.672536) | |
| 6 | 3 | 5, 7, 9 | (45,30) | (35.671382,139.672536) | |
| 7 | 3 | 6, 8 | (75,45) | (35.671382,139.675111) | |
| 8 | 2 | 3, 7 | (105,45) | (35.671382,139.679231) | |
| 9 | 3 | 6 | (45,15) | (35.671940,139.672536) | |
| 10 | 2 | 3 | - | (35.668244,139.684038) | |
| 11 | 2 | 7, 12 | - | (35.674798,139.675111) | |
| 12 | 3 | 9, 11 | - | (35.671940,139.675111) | |

FIG.17

| Index | Number of Blanches | Connected Index | Coordinates (X,Y) | Coordinates (Latitude, Longitude) | |
|---|---|---|---|---|---|
| 1 | 3 | 2, 4 | (10,80) | (35.668244,139.668760) | ~150 |
| 2 | 3 | 1, 3, 5 | (45,80) | (35.668244,139.672880) | |
| 3 | 3 | 2, 8 | (65,80) | (35.668244,139.675025) | |
| 4 | 2 | 1, 5 | (10,45) | (35.670266,139.669361) | |
| 5 | 3 | 2, 4, 6 | (45,45) | (35.670266,139.672536) | |
| 6 | 3 | 5, 7, 9 | (45,30) | (35.671382,139.672536) | |
| 7 | 3 | 6, 8 | (75,45) | (35.671382,139.675111) | |
| 8 | 2 | 3, 7 | (105,45) | (35.671382,139.679231) | |
| 9 | 3 | 6 | (45,15) | (35.671940,139.672536) | |
| 10 | 2 | 3 | - | (35.668244,139.684038) | |
| 11 | 2 | 7, 12 | - | (35.674798,139.675111) | |
| 12 | 3 | 9, 11 | - | (35.671940,139.675111) | |
| Destination A | | | (,) | (35.676960,139.674081) | |
| Landmark A | | | (,) | (35.675635,139.677686) | ~152 |
| Landmark B | | | (,) | (35.671730,139.676313) | |

| No | Starting point (X,Y) | Angle | Length | Width | Connected to |
|---|---|---|---|---|---|
| 1 | (45,80) | 0 | 12 | 3 | 2 |
| 2 | (65,80) | 45 | 11 | 2 | 6 |
| 3 | (45,80) | 180 | 6 | 3 | 5 |
| 4 | (45,50) | 180 | 5 | 1 | 5 |
| 5 | (10,50) | 270 | 4 | 1 | 3 |
| 6 | (45,30) | 0 | 12 | 2 | 8, 2 |
| 7 | (45,80) | 90 | 14 | 3 | 4, 6, 9 |
| 8 | (75,30) | 90 | 4 | 2 | - |
| 9 | (45,15) | 180 | 5 | 2 | - |

FIG.22

To: xxxxxx@xxxxxx.jp
Subject: Tomorrow's Practice Game
Body:
Tomorrow's game will be held at the following place at 15:00~
KC Stadium:
Yokohama-shi Tsuzuki-ku Kagahara X-Y-Z
Please come and join us.

To: xxxxxx@xxxxxx.jp

Subject: Tomorrow's Get-Together

Body:
How's it going? Tomorrow's get-together will be held at Izakaya-Bar xx Shibuya at 19:00~
Come and join us, and don't be late.

~232

MOBILE ELECTRONIC DEVICE AND CONTROL METHOD OF MOBILE ELECTRONIC DEVICE

CROSS-REFERENCE TO RELATED APPLICATION

This application is a National Stage of PCT international application Ser. No. PCT/JP2011/068796 filed on Aug. 19, 2011 which designates the United States, and which is based upon and claims the benefit of priority from Japanese Patent Applications No. 2010-191459, 2010-191460, and 2010-191461, filed on Aug. 27, 2010.

FIELD

The present disclosure relates to a mobile electronic device and a control method of the mobile electronic device.

BACKGROUND

A conventional device for projecting an image to a wall surface or a screen includes a so-called projector. The mainstream of the projector is a so-called stationary type device which is supplied with power from a commercial power supply and is used in a state of being fixed in a predetermined position. The stationary type projector projects an image to a given portion of the wall surface or to the screen in its fixed state.

Recently, on the other hand, a mobile projector compact in size and easy to carry is proposed as the projector. For example, Patent Literature 1 describes a mobile terminal with a projector function that includes an upper cabinet, a lower cabinet, and a hinge for mutually pivotally connecting the upper cabinet and the lower cabinet, and also includes a projector having a lens and a light source. Moreover, some mobile electronic devices display an image on a display unit such as a display.

CITATION LIST

Patent Literature

Patent Literature 1: JP-A-2007-96542

Technical Problem

The mobile electronic devices may sometimes display a map. However, a map cannot be made full use of just by displaying the map on the display unit of the mobile electronic device.

For the foregoing reasons, there is a need for a mobile electronic and a control method thereof that can improve the usefulness of the map.

SUMMARY

According to an aspect, a mobile electronic device includes: an imaging unit for capturing a map image; a processing unit for acquiring information for a specific image corresponding to the map image based on information included in the map image captured by the imaging unit; and an image projecting unit for projecting the specific image to a projection area.

According to another aspect, the processing unit is configured to acquire an image, as the specific image, that can be combined with the map image, and cause the image projecting unit to project the specific image.

According to another aspect, the mobile electronic device further includes a display unit for displaying an image. The processing unit is configured to acquire an image, as the specific image, that can be combined with the map image, and cause the display unit to display the specific image and the map image captured by the imaging unit in combination with each other.

According to another aspect, the specific image includes an image created by associating location information in the map image with location information in the data for the reference map and by associating information included in the data for the reference map with coordinates in the map image According to another aspect, the mobile electronic device further includes a location-information acquiring unit for acquiring location information of the mobile electronic device. The processing unit is configured to determine a range of data for the reference map to be compared with the map image based on the location information of the mobile electronic device acquired by the location-information acquiring unit.

According to another aspect, the specific image includes an image obtained by converting coordinates in the data for the reference map into coordinates in the map image in association with each other.

According to another aspect, the specific image includes information for a spot outside an area of the map image.

According to another aspect, the specific image includes a map representing outside the area of the map image.

According to another aspect, the specific image includes a marker indicating a direction to a specific spot outside the area of the map image.

According to another aspect, the processing unit is configured to specify a position indicated by the map image captured by the imaging unit, acquire related information related to the specified position, and acquire the information for the specific image obtained by arranging the acquired related information in a corresponding position of the map image.

According to another aspect, the related information is extracted based on search criteria from information associated with the map image.

According to another aspect, the mobile electronic device further includes an information acquiring unit for performing communication with an external device to acquire the related information. The processing unit is configured to acquire the related information through the information acquiring unit.

According to another aspect, the information acquiring unit is configured to acquire the related information from a database in which information is updated.

According to another aspect, the processing unit is configured to analyze the map image to specify an absolute position from elements included in the map image, and acquire the specific image corresponding to the specified absolute position.

According to another aspect, the mobile electronic device further includes a communication unit for performing communication with communication device. The processing unit is configured to output the map image to the communication device through the communication unit, and acquire the specific image from the communication device.

According to another aspect, the mobile electronic device further includes a communication unit for performing communication with a communication device. The processing unit is configured to specify a position indicated by the map image captured by the imaging unit, output information for the position to the communication device through the communication unit, and acquire the specific image from the communication device.

According to another aspect, a control method of a mobile electric device having an imaging unit and an image projecting unit, the control method comprising: capturing, by the imaging unit, a map in an imaging area of the imaging unit to acquire the map image; acquiring information for a specific image corresponding to the map image based on information included in the map image; and projecting, by the image projecting unit, the specific image.

According to another aspect, the projecting includes checking a position of the map using the imaging unit, and correcting a projection position of the specific image so that the map and the specific image are combined with each other.

According to another aspect, mobile electronic device comprising: an imaging unit for capturing a map image; a processing unit for acquiring information for a specific image corresponding to the map image based on information included in the map image captured by the imaging unit; and a display unit for displaying the map image and the specific image.

According to another aspect, the specific image includes information for a spot outside an area of the map image.

According to another aspect, the processing unit is configured to specify a position indicated by the map image captured by the imaging unit, acquire information related to the specified position, and acquire the information for the specific image obtained by arranging the acquired related information in a corresponding position of the map image.

According to another aspect, the display unit is configured to display the map image and the specific image in combination with each other.

Advantageous Effects of Invention

The advantages of one embodiment of the invention are that the usefulness of the map can be improved.

BRIEF DESCRIPTION OF DRAWINGS

FIG. 10 is an explanatory diagram for explaining the operation of the mobile electronic device.

FIG. 11 is an explanatory diagram for explaining the operation of the mobile electronic device.

FIG. 13 is an explanatory diagram for explaining the operation of the mobile electronic device.

FIG. 15 is an explanatory diagram for explaining the operation of the mobile electronic device.

FIG. 16 is an explanatory diagram for explaining the operation of the mobile electronic device.

FIG. 17 is an explanatory diagram for explaining the operation of the mobile electronic device.

FIG. 22 is an explanatory diagram for explaining an example of a screen displayed on a display.

FIG. 23 is an explanatory diagram for explaining another example of the screen displayed on the display.

DESCRIPTION OF EMBODIMENTS

The present invention will be explained in detail below with reference to the accompanying drawings. It should be noted that the present invention is not limited by the following explanation. In addition, the components in the explanation below include those which are easily thought of by persons skilled in the art, those which are substantially identical, and those in a scope of so-called equivalents. In the followings, a mobile phone is discussed as an example of the mobile electronic device; however, a target to which the present invention is applied is not limited to the mobile phones. Therefore, the present invention is also applicable to, for example, PHSs (Personal Handyphone Systems), PDAs, portable navigation devices, notebook computers, and gaming devices.

Figure 1:
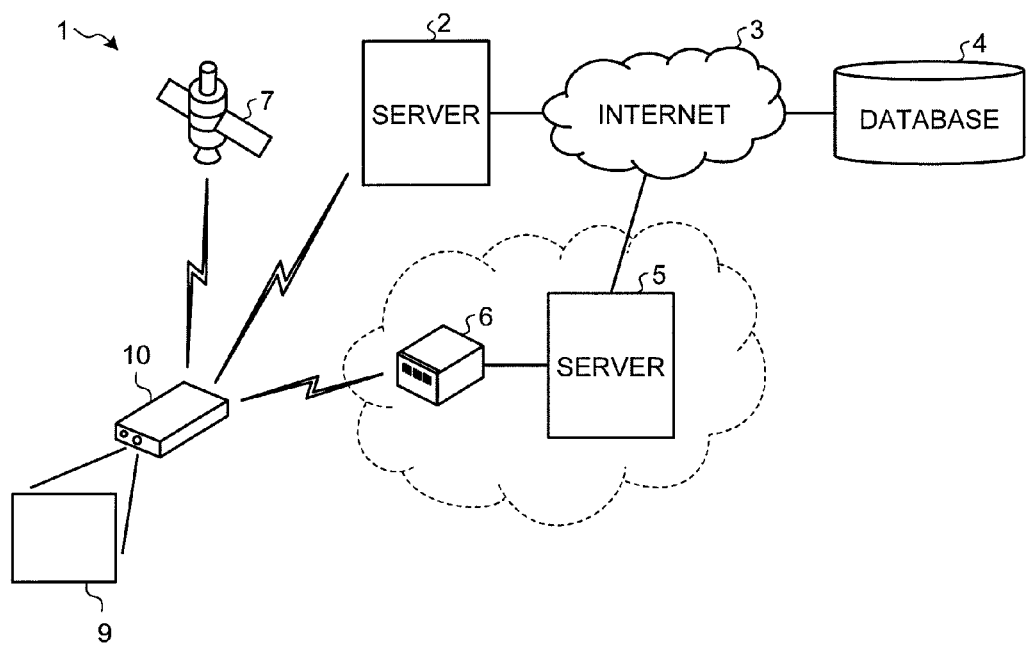
FIG. 1 is a schematic diagram illustrating a schematic configuration of a communication system with a mobile electronic device according to an embodiment.

FIG. 1 is a schematic diagram illustrating a schematic configuration of a communication system with a mobile electronic device according to an embodiment. A communication system 1 illustrated in FIG. 1 includes a server 2, an Internet communication network 3, a database 4, a server 5, a wireless communication device 6, a GPS satellite 7, and a mobile electronic device 10. The number of units constituting the communication system 1 is not particularly specified, and therefore a plurality of devices may be provided in each of the units. For example, the mobile electronic device 10 may be provided in a plural number for one server 2.

The server 2 has various data such as information (phone numbers and addresses) for identifying each of communication devices, and communicates with the mobile electronic device 10 through a communication network to supply various pieces of information. The server 2 and the mobile electronic device 10 perform communication with each other through a communication network formed with a base station and a relay station and for wirelessly transmitting and receiving communication waves. For the communication network, various communication methods can be used if communication can be performed between the server 2 and the mobile electronic device 10. For example, communication may be performed using a satellite channel.

The server 2 also relays information, i.e. receives information from the mobile electronic device 10 and communicates the information to other communication device based on the information through the Internet communication network 3. In other words, the server 2 collects and stores information sent from communication devices, and supplies (provides) the collected information to the communication devices as necessary. The server 2 can also convert (process) the collected information and supply the converted information to the communication devices.

The Internet communication network (hereinafter also called "Internet") 3 includes a switching system and wired and wireless communication lines. The Internet communication network 3 performs information communication between a communication device and the other communication device using a wired or wireless communication line. Specifically, the Internet 3 performs information communication between the server 2 and the server 5 and performs information communication between the server 2 and the database 4.

The database 4 is a storage device and stores therein various data such as map information and image processing information required for processes performed by the mobile electronic device 10. The database 4 supplies stored various pieces of information to the server 2 or the server 5 through the Internet 3.

The server 5 communicates with the mobile electronic device 10 via the wireless communication device 6 to receive and supply various pieces of information. The server 5 has basically the same configuration as that of the server 2 except for the communication method with the mobile electronic device 10 which is different from the other.

The wireless communication device 6 is a communication device for performing direct wireless communication with the mobile electronic device 10. The wireless communication device 6 can use a communication unit for communicating with the other communication device using, for example, a short-range wireless communication technology. As the short-range wireless communication technology, infrared communication (IrDA (registered trademark)), IrMC (registered trademark), IrSimple (registered trademark), visible light communication, Bluetooth (registered trademark), and RFID (Radio Frequency Identification) technologies can be used.

The GPS satellite 7 is a satellite that transmits (provides) information required for detecting location information to a communication device (communication terminal, communication equipment) provided with a GPS (Global Positioning System) communication function. FIG. 1 depicts only one GPS satellite 7; however, the number (mainly, three or four) of GPS satellites 7 required to specify the location of the communication device are provided. The GPS satellites 7 respectively transmit information required to detect location information to the mobile electronic device 10.

The mobile electronic device 10 is a mobile communication device provided with a function of capturing an image and a function of displaying an image. The mobile electronic device 10 acquires an image of a map 9 to be captured, performs a process based on the acquired image of the map 9 to generate an image, and displays the generated image. The display method includes a method of displaying an image on the display unit and a method of projecting an image. The mobile electronic device 10 will be explained in detail below.

Figure 2:
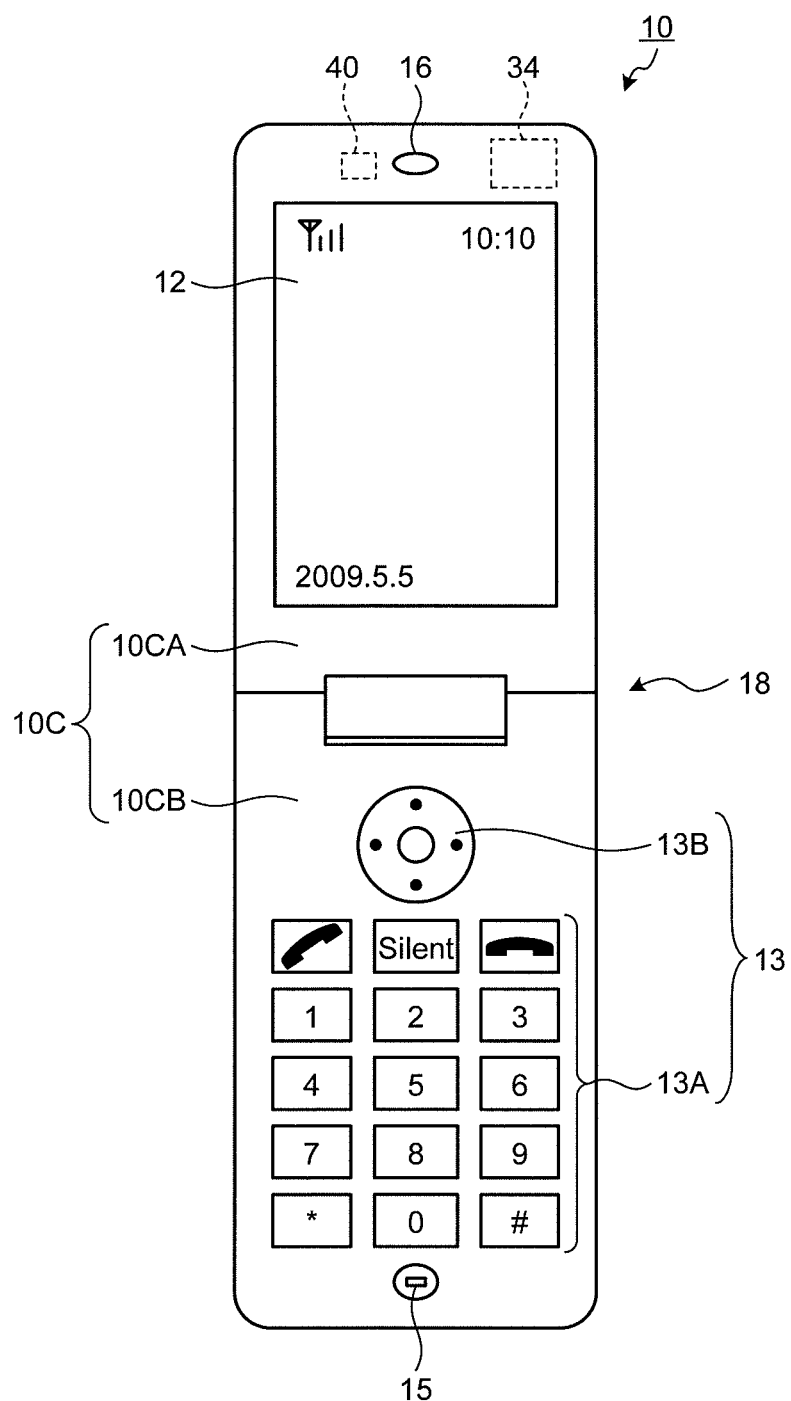
FIG. 2 is a front view illustrating a schematic configuration of the mobile electronic device according to the embodiment.
Figure 3:
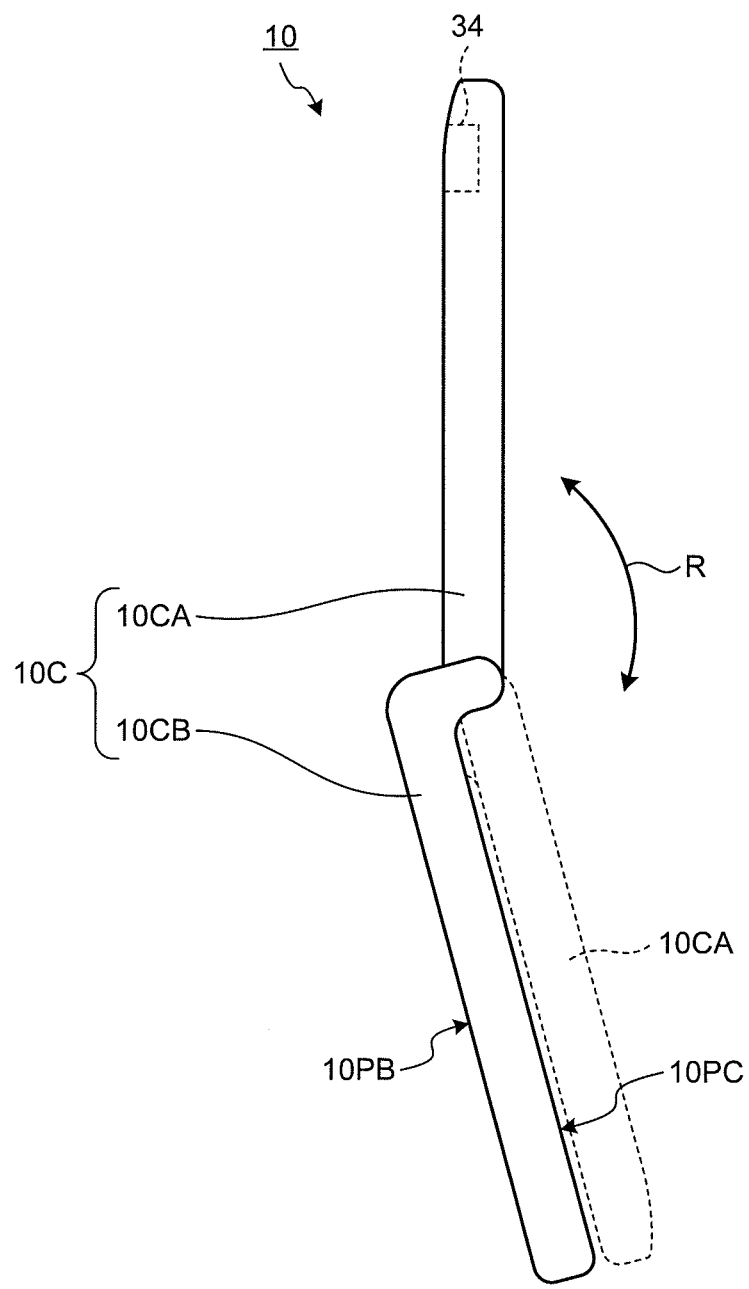
FIG. 3 is a side view of the mobile electronic device illustrated in FIG. 2.

FIG. 2 is a front view illustrating a schematic configuration of the mobile electronic device according to the embodiment. FIG. 3 is a side view of the mobile electronic device illustrated in FIG. 2. The mobile electronic device 10 illustrated in FIG. 2 and FIG. 3 is a mobile phone that includes a wireless communication function, an output unit, a sound acquiring unit, and an imaging unit. The mobile electronic device 10 is formed with a housing 10C having a plurality of housings. Specifically, the housing 10C includes a first housing 10CA and a second housing 10CB which are configured to be openable and closable. In other words, the mobile electronic device 10 has a foldable housing. The housing of the mobile electronic device 10, however, is not limited to this configuration. For example, the housing of the mobile electronic device 10 may be a slidable housing with two housings in which one housing and the other housing can mutually slide each other from a state in which both the housings are overlapped, a rotating housing in which one of housings is made to rotate around an axis line along an overlapping direction, or a housing in which two housings are coupled to each other through a two-axis hinge.

The first housing 10CA and the second housing 10CB are coupled to each other by a hinge mechanism 18 being a connector. By coupling the first housing 10CA and the second housing 10CB with the hinge mechanism 18, both the first housing 10CA and the second housing 10CB can pivot around the hinge mechanism 18 so as to pivot in a direction farther away from each other and a direction closer to each other (directions indicated by arrow R in FIG. 3). When the first housing 10CA and the second housing 10CB pivot in the direction farther away from each other, the mobile electronic device 10 opens, while when the first housing 10CA and the second housing 10CB pivot in the direction closer to each other, the mobile electronic device 10 closes, to become a folded state (state indicated by dotted line in FIG. 3).

The first housing 10CA includes a display 12 illustrated in FIG. 2 as a display unit. The display 12 displays an idle image when the mobile electronic device 10 awaits reception, and displays a menu image used to assist the operations of the mobile electronic device 10. The first housing 10CA also includes a receiver 16 being an output unit that outputs a sound during a phone call on the mobile electronic device 10.

The second housing 10CB includes a plurality of operation keys 13A used to input a phone number of an intended party and text when a mail is composed, and the like, and also includes a direction key and decision key (direction and decision key) 13B so as to easily perform a selection and decision of a menu displayed on the display 12 and a scroll of a screen, and the like. The operation keys 13A and the direction key and decision key 13B constitute an operating unit 13 of the mobile electronic device 10. Provided in the second housing 10CB is a microphone 15 being a sound acquiring unit that receives a sound during a phone call on the mobile electronic device 10. The operating unit 13 is provided on an operating surface 10PC of the second housing 10CB as illustrated in FIG. 3. The face opposite to the operating surface 10PC is a back face 10PB of the mobile electronic device 10.

An antenna is internally provided in the second housing 10CB. The antenna is a transmitting/receiving antenna used for wireless communication, and is used for transmission/reception of radio waves (electromagnetic waves) for phone calls and e-mails and so on between the mobile electronic device 10 and a base station. The second housing 10CB includes the microphone 15. The microphone 15 is provided on the operating surface 10PC side of the mobile electronic device 10 as illustrated in FIG. 3.

Provided along an area of the first housing 10CA on the opposite side to the hinge mechanism 18 are a projector 34 being an image projecting unit and a camera 40 for imaging (capturing) an image on a plane to which an image is projected. A light emitting portion of the projector 34 and an imaging window of the camera 40 are exposed to the outside of the first housing 10CA. This configuration enables the projector 34 to project an image to a projection target. The camera 40 acquires a distance to an image in the area to which the image is projected, and this enables to automatically focus on the image to be projected by the projector 34, and the like. The camera 40 captures an image in the area to which the image is projected, and this enables to adjust a size and a focal length of an image to be projected.

Figure 4:
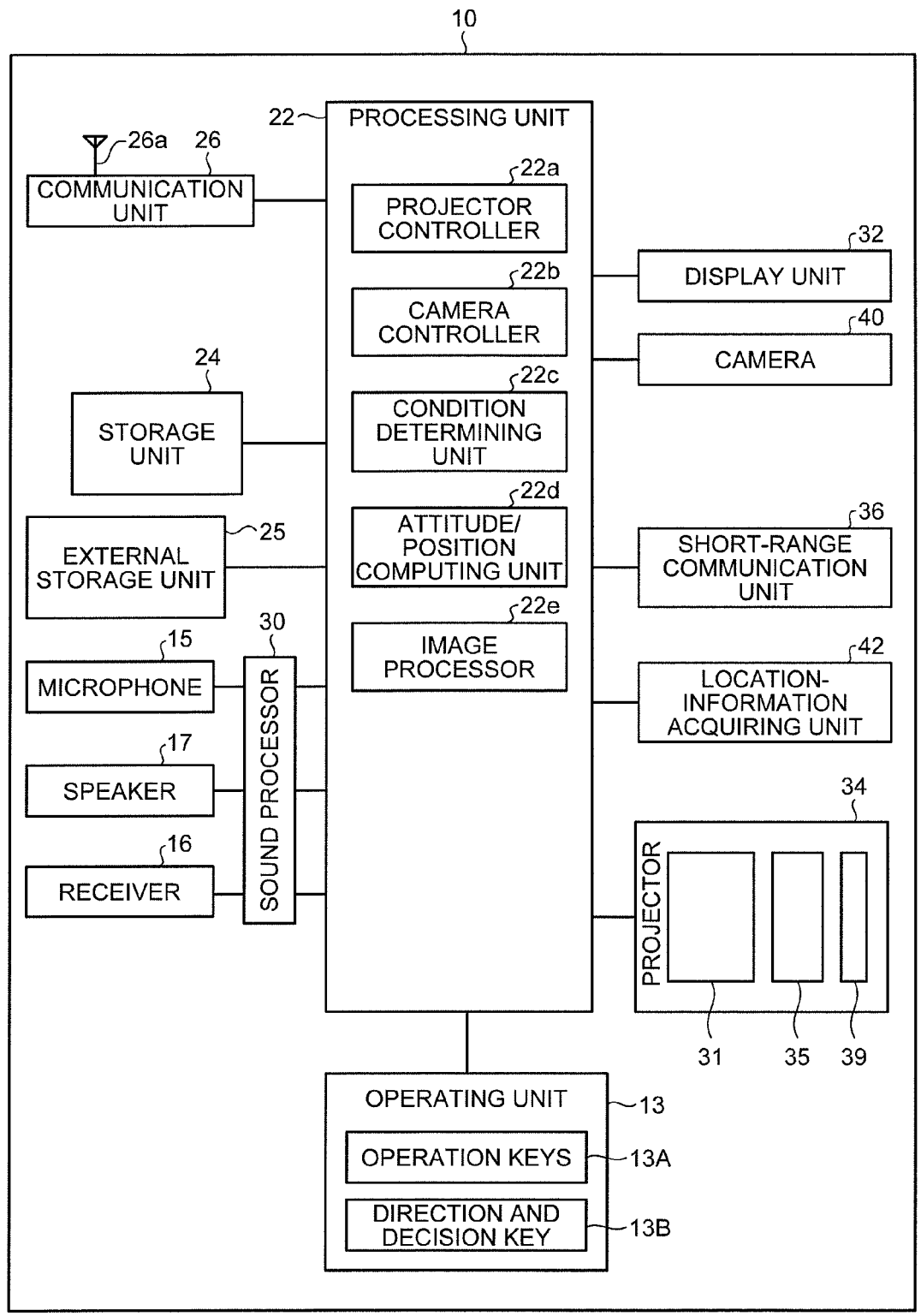
FIG. 4 is a block diagram illustrating a schematic configuration of functions of the mobile electronic device illustrated in FIG. 2 and FIG. 3.

FIG. 4 is a block diagram of a schematic configuration of functions of the mobile electronic device illustrated in FIG. 2 and FIG. 3. As illustrated in FIG. 4, the mobile electronic device 10 includes a processing unit 22, a storage unit 24, an external storage unit 25, a communication unit 26, the operating unit 13, a sound processor 30, a display unit 32, the projector 34, a short-range communication unit 36, the camera 40, and a location-information acquiring unit 42. The processing unit 22 includes a function of integrally controlling an entire operation of the mobile electronic device 10. That is, the processing unit 22 controls the operations of the communication unit 26, the sound processor 30, the display unit 32, the short-range communication unit 36, the location-information acquiring unit 42, and so on so that various processes of the mobile electronic device 10 are executed in an appropriate procedure according to an operation through the operating unit 13 and software stored in the storage unit 24 of the mobile electronic device 10.

The various processes of the mobile electronic device 10 are, for example, a voice call made through a line switching network, composition and transmission/reception of e-mails, and browsing of Web (World Wide Web) sites on the Internet. The operations of the communication unit 26, the sound processor 30, the display unit 32, and so on are, for example, signal transmission/reception by the communication unit 26, sound input/output by the sound processor 30, and image display by the display unit 32.

The processing unit 22 executes processes based on programs (for example, operating system programs and application programs) stored in the storage unit 24. The processing unit 22 is formed with, for example, MPU (Micro Processing Unit), and executes the various processes of the mobile electronic device 10 according to the procedure instructed by the software. That is, the processing unit 22 successively reads operation codes from the operating system programs, the application programs, or so stored in the storage unit 24, and executes the processes.

The processing unit 22 has a function of executing a plurality of application programs. The application programs executed by the processing unit 22 include a plurality of application programs such as an application program for controlling the drive of the projector 34 and the camera 40, an application program for reading various image files (image information) from the storage unit 24 and decoding them, and an application program for causing the display unit 32 to display an image obtained by being decoded or for causing the projector 34 to project the image.

In the present embodiment, the processing unit 22 includes a projector controller 22a for controlling the operations of the projector 34, a camera controller 22b for controlling the operations of the camera 40, a condition determining unit 22c for determining the condition of a projection area based on the image captured by the camera 40 and an input through the operating unit 13, an attitude/position computing unit 22d for computing and calculating an attitude and a position of the housing 10C with respect to a projection plane, and an image processor 22e for converting and generating an image to be displayed by the display unit 32 and an image to be displayed by the projector 34. The functions provided in the projector controller 22a, the camera controller 22b, the condition determining unit 22c, the attitude/position computing unit 22d, and the image processor 22e are implemented by hardware resources which are formed with the processing unit 22 and the storage unit 24 and perform each task assigned by a control unit of the processing unit 22. The task mentioned here represents a unit of processing in which some processes cannot be simultaneously executed, among all the processes performed by the application software or among processes performed by the same application software.

The storage unit 24 stores therein software and data used for processes executed by the processing unit 22, and stores therein a task activating the application program for controlling the drive of the projector 34 and the camera 40 and a task activating an image processing program. The storage unit 24 stores therein, in addition to the tasks, for example, sound data downloaded or obtained through communications, software used by the processing unit 22 to provide control for the storage unit 24, an address book in which phone numbers, mail addresses, and so on of the intended parties are written for management, a sound file such as a dial tone and a ring tone, and temporary data or so used in the process of the software.

The computer program and the temporary data used in the process of the software are temporarily stored in a work area of the storage unit 24 assigned thereto by the processing unit 22. The storage unit 24 includes, for example, nonvolatile storage devices (nonvolatile semiconductor memory such as ROM: Read Only Memory, a hard disk drive, and so on), and a readable/writable storage device (e.g., SRAM: Static Random Access Memory, and DRAM: Dynamic Random Access Memory).

The external storage unit 25 is a storage device that includes an external memory and a connection terminal, the external memory being removable from the housing 10C. Stored in the external memory are various types of software and data similarly to the storage unit 24. By connecting the external memory and the processing unit 22 through the connection terminal, the external storage unit 25 performs write and read of information to and from the external memory, similarly to the storage unit 24. Because the external memory of the external storage unit 25 is removable, the external memory connected to the processing unit 22 can be replaced. Various storage media such as an SD card (registered trademark), a Memory Stick (registered trademark), smart media, and USB memory can be used as the external memory.

The communication unit 26 includes an antenna 26a, and establishes a wireless signal path using CDMA (Code Division Multiple Access) system or so with a base station via a channel assigned by the base station and performs telephone communication and information communication with the base station. The operating unit 13 includes the operation keys 13A respectively assigned with various functions such as a power key, a talk key, numeric keys, character keys, direction keys, a decision key, and a send key; and the direction and decision key 13B. When a user operation is input to any one of the keys, the key generates a signal corresponding to the user operation. The generated signal is input to the processing unit 22 as an instruction of the user.

The sound processor 30 performs processes on a sound signal input to the microphone 15 and a sound signal output from the receiver 16 or a speaker 17. That is, the sound processor 30 amplifies the sound input through the microphone 15, subjects the sound to AD conversion (Analog-to-Digital conversion), thereafter, subjects the sound to signal processing such as encoding, converts the sound to digital sound data, and outputs the converted sound data to the processing unit 22. The sound processor 30 subjects the sound data sent from the processing unit 22 to processes such as decoding, DA conversion (Digital-to-Analog conversion), and amplification, converts the sound signal to an analog sound signal, and then outputs the converted sound signal to the receiver 16 and the speaker 17. The speaker 17 is disposed in the housing 10C of the mobile electronic device 10, and outputs a ring tone, a send tone of mail, or the like.

The display unit 32 includes the display 12, and displays a picture according to video data and an image according to image data supplied from the processing unit 22 on a display panel. The display 12 is formed with a display panel including LCD (Liquid Crystal Display), an OEL (Organic Electro-Luminescence) panel, or so. The display unit 32 may include a sub-display in addition to the display 12.

The projector 34 includes a light source and an optical system for switching whether to project or not light emitted from the light source based on the image data. In the present embodiment, the projector 34 includes a visible-light irradiation device (visible-light irradiating unit) 31 being the light source, a drawing device 35 being the optical system, and a focus adjustment device 39. The visible-light irradiation device 31 irradiates visible laser light. The light in a visible light region is a light whose range in its short wavelength side is from 360 nm to 400 nm and whose range in its long wavelength side is from 760 nm to 830 nm. In the present embodiment, the visible-light irradiation device 31 irradiates lights in three colors: R (Red), G (Green), and B (Blue).

The drawing device 35 synthesizes the lights in the three colors irradiated from the visible-light irradiation device 31, and irradiates the synthesized lights to the image projection target. The drawing device 35 includes a switching element for switching whether to pass or not the light emitted from the light source therethrough and a mirror for causing the light having passed through the switching element to perform raster scan. The drawing device 35 changes an angle of the laser light emitted from the visible-light irradiation device 31 by the mirror and scans the laser light on the image projection target, to thereby project the image to the image projection target.

Used as the mirror is, for example, an MEMS (Micro Electro Mechanical System) mirror. The MEMS mirror uses a piezoelectric element to drive the mirror, scans the visible light irradiated from the visible-light irradiation device 31, and generates a visible image and an invisible image. In this case, the mirror is used to change an angle of the light irradiated from the light source and scan the light irradiated from the light source over the whole surface of the image projection target, so that the visible image or the invisible image can be projected to the image projection target. As explained above, the projector 34 is a scan type projector. The configuration of the projector 34 is not limited to the projector configured to use the laser as a light source. For example, the projector 34 may be a projector that uses a halogen light, an LED light source, or an LD light source as a light source and that includes an LCD (Liquid Crystal Display) or a DMD (Digital Micro-mirror Device) in the optical system.

The focus adjustment device 39 includes a function (focus adjustment function) of forming a visible image projected from the drawing device 35 on the image projection target by an instruction sent from the projector controller 22a. The focus adjustment device 39 is provided with, for example, a focus adjustment mechanism including a movable lens and so on, and moves the lens to implement the focus adjustment function. The focus adjustment device 39 may implement the focus adjustment function by causing the image processor 22e to subject data for an image projected by the projector 34 to predetermined image processing. The focus adjustment device 39 may implement the focus adjustment function by the focus adjustment mechanism and the image processing.

Figure 5:
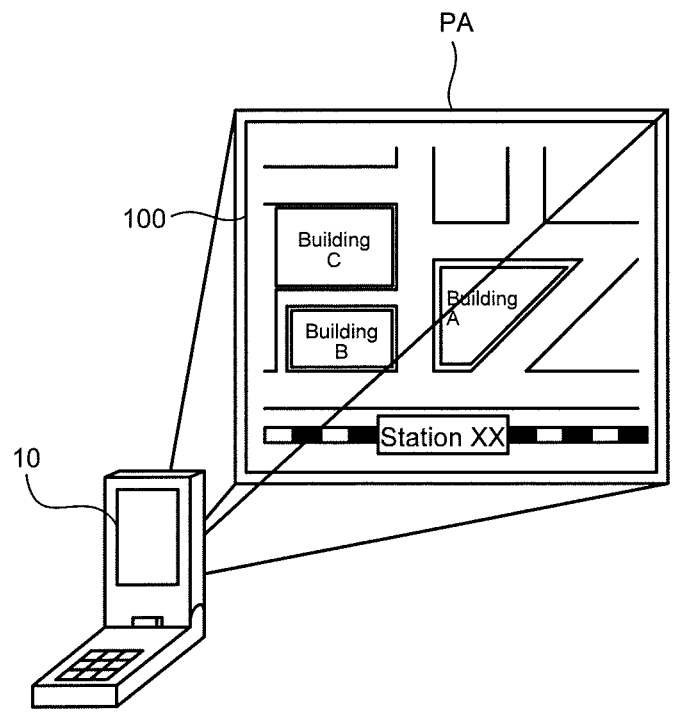
FIG. 5 is an explanatory diagram illustrating a state in which an image is displayed by a projector of the mobile electronic device illustrated in FIG. 2.

As explained above, the projector 34 of the mobile electronic device 10 is an image projecting unit for projecting an image, and its image projecting surface is exposed to the outside of the housing 10C of the mobile electronic device 10. The mobile electronic device 10 projects an image from the projector 34 and can thereby project the image to a predetermined area (projection area) PA, as illustrated in FIG. 5, of the image projection target (e.g., a wall surface and a screen) at a location facing the image projecting surface of the projector 34. The operation of the projector 34 is controlled by the processing unit 22, and the projector 34 projects various pictures such as a still image and a moving image sent from the processing unit 22 to be displayed in the projection area PA. The example of FIG. 5 represents a case of setting an area, as the projection area PA, in which a map 100 such as a map for a direction board is displayed.

Then the short-range communication unit 36 is a communication unit for performing communication with other communication device by using short-range wireless communication technology. As the short-range wireless communication technology, infrared communication (IrDA (registered trademark), IrMC (registered trademark), IrSimple (registered trademark)), visible light communication, Bluetooth (registered trademark), and RFID (Radio Frequency Identification) technology can be used. For example, when RFID is used, the short-range communication unit 36 includes an IC tag for identifying itself and a reader for reading an IC tag provided in any other communication device.

The location-information acquiring unit 42 is a communication unit for receiving a GPS signal transmitted from the GPS satellite 7. The location-information acquiring unit 42 calculates a latitude and a longitude of the mobile electronic device 10 from the received GPS signal, and transmits information for the calculated latitude and longitude to the processing unit 22.

The camera 40 is an imaging system that is disposed near the light emitting portion of the projector 34 and captures an image in an area including the projection area. That is, the camera 40 captures an image in a light emission direction of the projector 34. The camera 40 is the imaging system for capturing an image at a wider field angle than a projection field angle of an image projected by the projector 34, and can capture an image in a wider area than a projection area where an image is projected by the projector 34. The mobile electronic device 10 is configured basically in the above manner.

Figure 6:
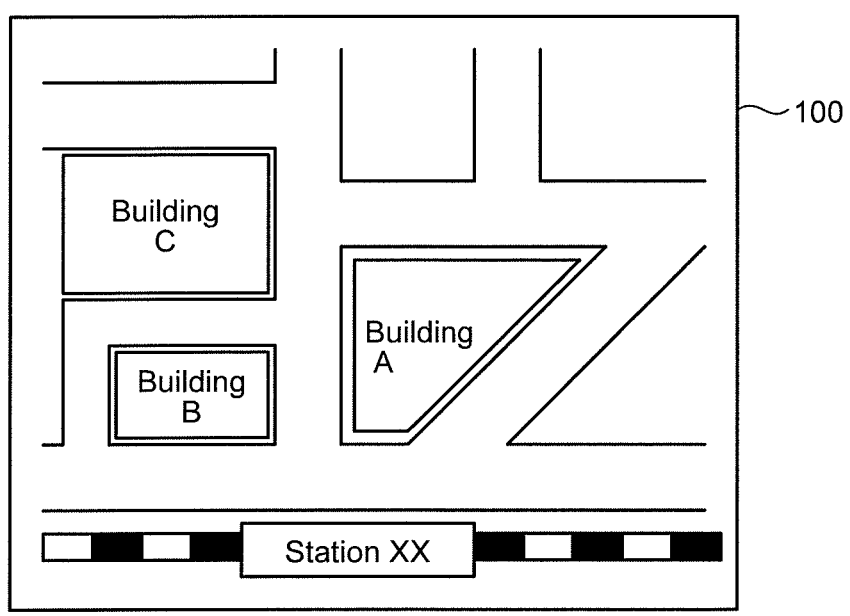
FIG. 6 is a schematic diagram illustrating an example of a map.
Figure 7:
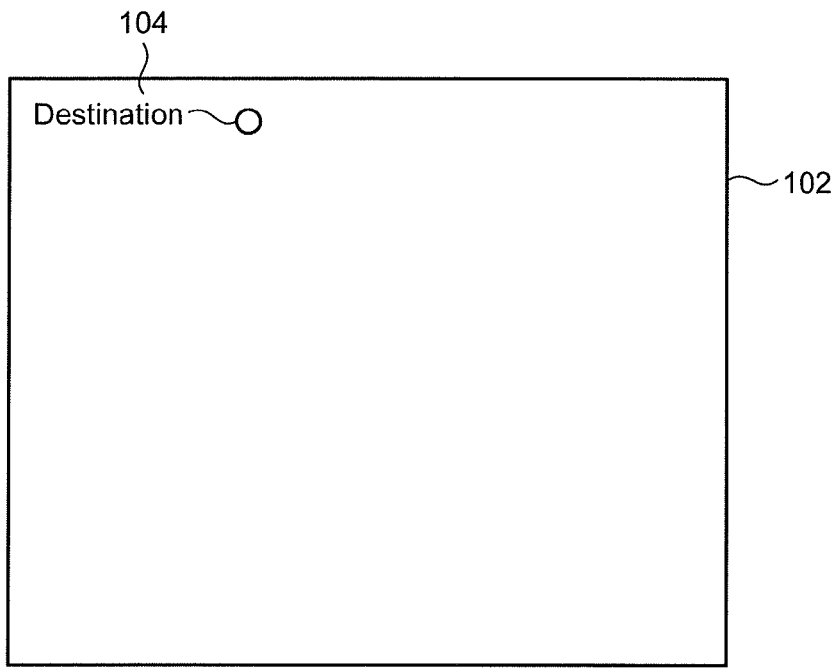
FIG. 7 is a schematic diagram illustrating an example of an image to be projected onto the map.
Figure 8:
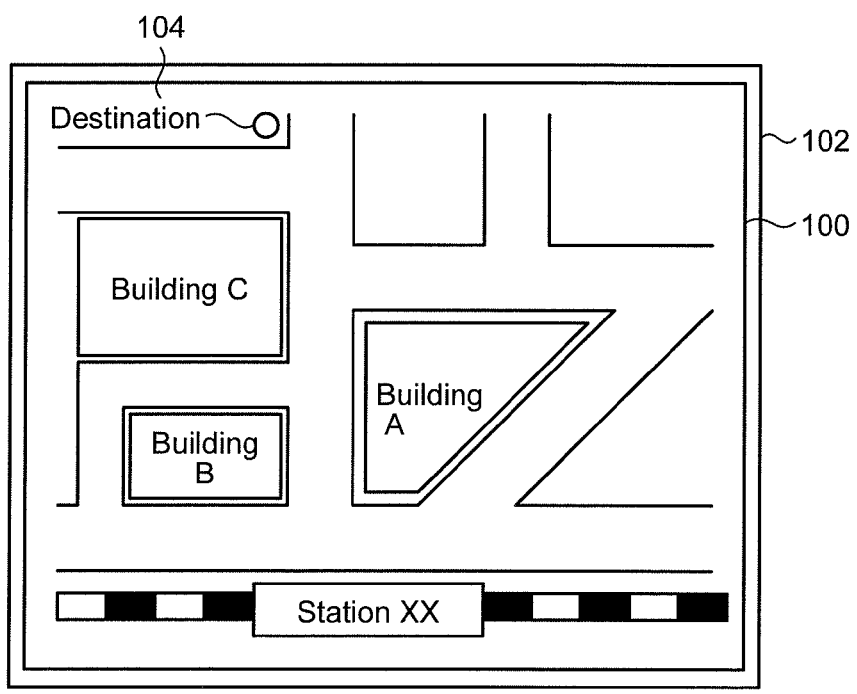
FIG. 8 is an explanatory diagram illustrating an example of the state in which the image is displayed by the projector of the mobile electronic device.

Then an operation of the mobile electronic device will be explained below with reference to FIG. 6 to FIG. 8. FIG. 6 is a schematic diagram illustrating an example of a map. FIG. 7 is a schematic diagram illustrating an example of an image to be projected onto the map. FIG. 8 is an explanatory diagram illustrating an example of the state in which the image is displayed by the projector of the mobile electronic device illustrated in FIG. 5.

First of all, the mobile electronic device 10 captures and acquires the map 100 illustrated in FIG. 6 using the camera 40. When the image of the map 100 is acquired, the mobile electronic device 10 analyzes the image of the map 100 and specifies which area the captured map 100 indicates. Then, when the area indicated by the map 100 is specified, the mobile electronic device 10 acquires a specific image corresponding to the map 100. For example, a specific image 102 illustrated in FIG. 7 is an image displaying a marker 104 indicating that a predetermined position on the map 100 is a destination.

As illustrated in FIG. 8, when the specific image 102 is acquired, the mobile electronic device 10 causes the projector 34 to project the acquired specific image 102 on the map 100. This enables the marker 104 of the destination to be displayed on the map 100.

Figure 9:
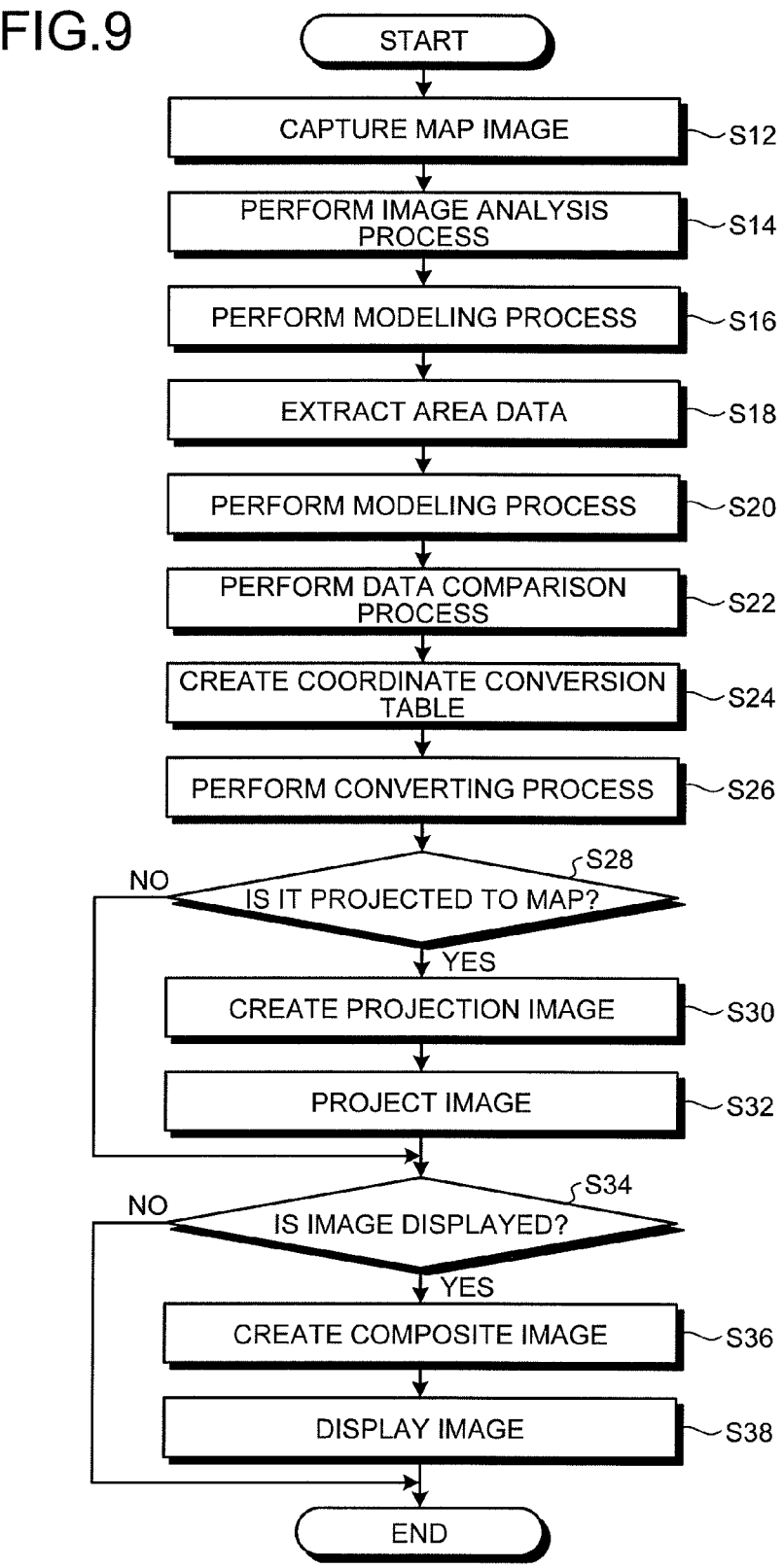
FIG. 9 is a flowchart for explaining an example of an operation of the mobile electronic device.
Figure 12:
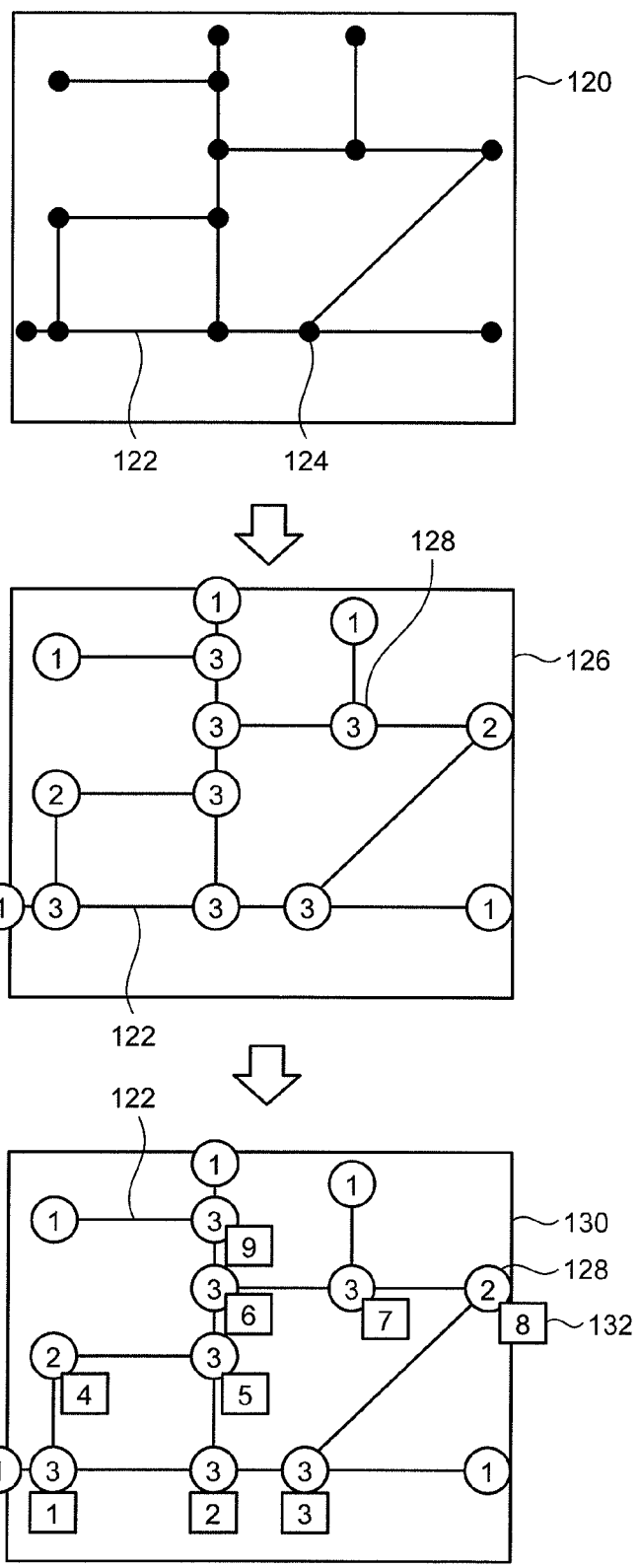
FIG. 12 is an explanatory diagram for explaining the operation of the mobile electronic device.
Figure 14:
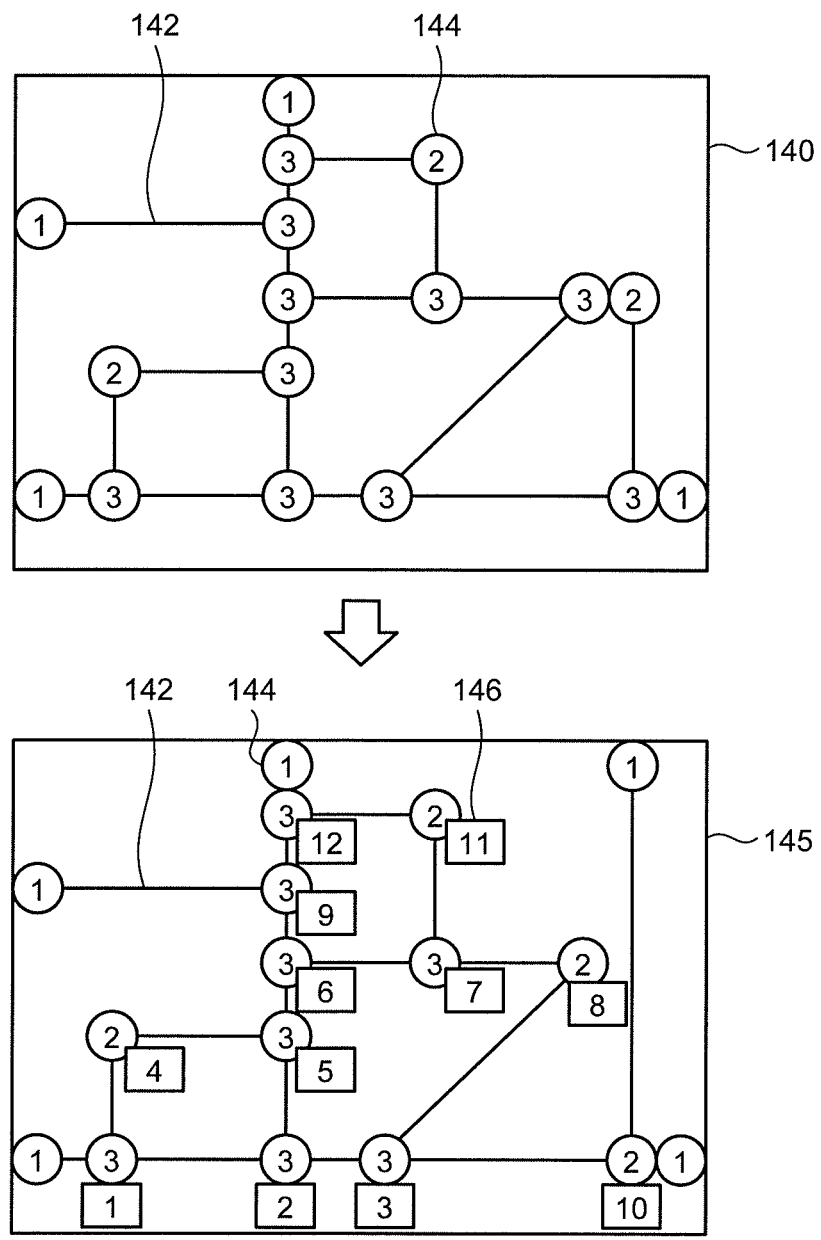
FIG. 14 is an explanatory diagram for explaining the operation of the mobile electronic device.

An operation of the mobile electronic device will be explained below with reference to FIG. 9 to FIG. 17. FIG. 9 is a flowchart illustrating an example of the operation of the mobile electronic device. FIG. 10 to FIG. 17 are explanatory diagrams for explaining operations of the mobile electronic device. The operation illustrated in FIG. 9 may be performed whenever the projector 34 or the camera 40 is activated or may be executed when an execution instruction of a mode to perform the operation in FIG. 9 is input. The operation in FIG. 9 may be processed by executing an application stored in the storage unit 24 or may be processed by executing an application stored in the external storage unit 25. In other words, the program for executing the operation in FIG. 9 may be stored in any of the areas. The program can be acquired by downloading it from an external device or can be acquired by reading it from the external storage unit 25. The mobile electronic device 10 may be configured to transmit part of process information to the server 2 or the server 5 and perform the process in the server 2 or the server 5.

First of all, at Step S12, the processing unit 22 of the mobile electronic device 10 captures a map image. That is, the processing unit 22 captures an image including a map such as a direction board through the camera 40. An imaging area may be adjusted by the user or may be automatically adjusted. When the map image is captured at Step S12, then at Step S14, the processing unit 22 performs an analysis process of the image, i.e. analyses the map image captured at Step S12. Specifically, the processing unit 22 extracts a shape of a road or shapes of blocks on the map from the captured map image. When the image is analyzed at Step S14, then at Step S16, the processing unit 22 performs a modeling process on the analyzed map image.

Specifically, when the image of the map 100 as illustrated in FIG. 6 is captured and acquired at Step S12, then at Step S14, the processing unit 22 analyzes the image of the map 100, for example, performs a digitization process, so that a road 111 can be extracted from the image of the map 100 as illustrated in an image 110 of FIG. 10. At this time, the processing unit 22 digitizes a color in a color range 114 corresponding to a color of the road 111 as black and the other colors as white, of a color histogram illustrated in FIG. 11. Moreover, by extracting an area corresponding to the road from the digitized image data, the processing unit 22 can extract the road 111 as illustrated in the image 110. Thereafter, as illustrated in an image 112 of FIG. 10, the processing unit 22 subjects the road 111 of the image 110 to thinning to obtain a road 113. Subsequently, the processing unit 22 extracts feature points from the thinned road 113 as illustrated in the image 112. Specifically, as illustrated in an image 120 of FIG. 12, the processing unit 22 extracts a connection point between a road 122 and a road 122 and an end point of a road 122 as feature points 124.

As illustrated in the image 120, when the image is analyzed and feature points are extracted, then at Step S16, the processing unit 22 performs modeling. Specifically, as illustrated in an image 126, the processing unit 22 performs modeling on the extracted feature points 124 of the image 120. That is, the processing unit 22 calculates the number of branches at each of feature points 128. A number indicated in a circle of the feature point 128 is the number of branch points. Subsequently, the processing unit 22 assigns indices (identification numbers) 132 to the feature points 128 respectively as illustrated in an image 130. The processing unit 22 then makes a list of the feature points as illustrated in FIG. 13. Items of the list include Index, Number of Branches, Connected Index being connected to the relevant index, and Coordinates of Index (relative coordinates in the image). The processing unit 22 performs the processes represented by the images in FIG. 10 and FIG. 11 by using arithmetic processing for the image data.

Subsequently, at Step S18, the processing unit 22 extracts area data. That is, the processing unit 22 extracts data for an area corresponding to the map represented by the map image. The processing unit 22 according to the present embodiment acquires location information of the mobile electronic device 10 from the GPS satellite 7 by the location-information acquiring unit 42 and narrows down the area corresponding to the map based on the acquired location information. In other words, the processing unit 22 extracts the area centering on the acquired location information. The processing unit 22 also extracts data (area data) for the map corresponding to the extracted area. The area data may be acquired from the database 4 by performing communication with the server 2 or the server 5 through the communication unit 26 or through the short-distance communication unit 36, or may be extracted from map data stored in the storage unit 24 or the external storage unit 25 of the mobile electronic device 10.

When the area image is extracted at Step S18, then at Step S20, the processing unit 22 performs the modeling process on the area data. That is, the processing unit 22 performs modeling on the map data corresponding to the extracted area. Specifically, the processing unit 22 performs thinning on the roads of the map data. The map data may also be data thinned at the time of its acquisition. Thereafter, as illustrated in an image 140 of FIG. 14, the processing unit 22 extracts feature points 144 from a road 142 and calculates the number of branches at each of the feature points 144. A number indicated in a circle of the feature point 144 is also the number of branch points. The processing unit 22 then assigns indices (identification numbers) 146 to the feature points 144 respectively as illustrated in an image 145. Subsequently, the processing unit 22 makes a list of the feature points as illustrated in FIG. 15. Items of the list include Index, Number of Branches, Connected Index being connected to the relevant index, and Coordinates of Index. The feature points extracted from the area data are associated with Latitude and Longitude as Coordinates.

When the modeling process is performed at Step S20, then at Step S22, the processing unit 22 performs a data comparison process. That is, the processing unit 22 compares the data for the map image modeled at Step S16 with the area data modeled at Step S20, and specifies which location in the area data the map image indicates. Specifically, the processing unit 22 compares the list of the feature points of the map image in FIG. 13 with the list of the feature points of the area data in FIG. 15, and detects feature points with identical correlation. That is, the processing unit 22 detects an area in which the shapes of the modeled roads match each other between the map image and the area data. According to the present embodiment, the feature points of the indices 1 to 9 in the both lists correspond to each other.

When the data comparison process is performed at Step S22, then at Step S24, the processing unit 22 creates a coordinate conversion table. Specifically, the processing unit 22 associates coordinates in the map image with coordinates in the area data and calculates a conversion rule for converting the coordinates in the area data to the coordinates in the map image. In particular, as illustrated in FIG. 16, the processing unit 22 associates indices of the map image with indices of the area data respectively, and creates a list in which the coordinates in the map image of the indices each indicating the identical feature points are associated with the coordinates in the area data. In the list illustrated in FIG. 16, the data surrounded by a frame 150 is data in which the coordinates in the map image are associated with the coordinates in the area data. The processing unit 22 creates the coordinate conversion table based on the data surrounded by the frame 150.

When the coordinate conversion table is created at Step S24, then at Step S26, the processing unit 22 performs the converting process. That is, the processing unit 22 processes for converting the area data based on the created coordinate conversion table. Specifically, as illustrated in a list of FIG. 17, the processing unit 22 converts the coordinates of a predetermined object stored in the area data to coordinates in the map image. In the list of FIG. 17, coordinates of display positions required to display a destination A, a landmark A, and a landmark B included in the area data in the map image are calculated. In other words, as illustrated in a frame 152, the coordinates in the area data are converted to the coordinates in the map image.

When the converting process is performed at Step S26, then at Step S28, the processing unit 22 determines whether the image is to be projected to the map, i.e. whether the projector 34 projects the image onto the map being a subject to be captured. When it is determined that the image is not projected to the map at Step S28 (No at Step S28), the processing unit 22 proceeds to Step S34. When it is determined that the image is projected to the map at Step S28 (Yes at Step S28), then at Step S30, the processing unit 22 creates a projection image. That is, the processing unit 22 creates an image, as the projection image, to be displayed onto the map (i.e. an image capable of being combined with and displayed on the map) based on the image generated through performing the converting process at Step S26. When the projection image is created at Step S30, then at Step S32, the processing unit 22 causes the projector 34 to project the created image. The processing unit 22 causes the camera 40 to capture an area to which the image is projected, and projects the image so that the projection image is superimposed on the predetermined position of the map.

When it is determined as No at Step S28 or when the process at Step S32 is performed, then at Step S34, the processing unit 22 determines whether the image is to be displayed, i.e. whether the image is displayed on the display unit 32. When it is determined that the image is not displayed at Step S34 (No at Step S34), the processing unit 22 ends the process. When it is determined that the image is displayed at Step S34 (Yes at Step S34), then at Step S36, the processing unit 22 creates a composite image. That is, the processing unit 22 creates an image, as the composite image, obtained by superimposing the image subjected to the predetermined conversion on the image of the map captured at Step S12 based on the image generated through performing the converting process at Step S26. When the composite image is created at Step S36, then at Step S38, the processing unit 22 displays the created composite image on the display unit 32. After the display of the image at Step S38, the processing unit 22 ends the process.

As explained above, the communication system 1 and the mobile electronic device 10 are configured to analyze the map image captured by the camera 40 and compare the analyzed map image with the data for a map being a previously stored reference (which is associated with, for example, a latitude and a longitude). The communication system 1 and the mobile electronic device 10 are also configured to specify the position of the map image captured by the camera 40 and calculate a relative relationship between each portion of the map image captured by the camera 40 and each portion of the data for a reference map. Thereby, a converted image for the map image captured by the camera 40 can be easily created. Furthermore, the data for the reference map can be converted in accordance with the map image captured by the camera 40, and therefore a converted image corresponding to a display rule (scale, the degree of abstraction) of the map image captured by the camera 40 can be created. This allows an easy-to-see and easy-to-understand image when the converted image is superimposed on the map image captured by the camera 40.

The communication system 1 and the mobile electronic device 10 can display a marker indicating a destination at an appropriate position, for example, even when the destination is desired to be displayed on the map image captured by the camera 40 as explained above. In addition, by causing the projector 34 to project an image to the map whose image is captured, the communication system 1 and the mobile electronic device 10 can display information for the destination on a largely displayed map or on a map currently visually checked by the user. Moreover, the communication system 1 and the mobile electronic device 10 display an image in which a converted image is superimposed on the captured map on the display unit 32, so that the map and the destination can be checked even at a location away from a place where the map is captured. In this case, also, the destination and the current location can be checked by the image using the map (captured map image) that is once checked. Therefore the user can easily recognize the map.

In the embodiment, the image processing and the arithmetic processing are performed by the mobile electronic device 10; however, the present invention is not limited thereto. For example, part of the image processing and the arithmetic processing may be performed by the server 2 or the server 5. In this case, the mobile electronic device 10 may transmit the image data and data required for the arithmetic processing to the server 2 or the server 5, and may receive the result of the processing from the server 2 or the server 5. In other words, the mobile electronic device 10 may cause the server 2 or the server 5 to perform part of or whole of the processes from Step S14 to Step S26, at Step S30, and Step S36, among the processes of FIG. 9. For example, the mobile electronic device 10 may transmit a captured image to the server 2 or the server 5, receive image data from the server 2 or the server 5, and display or project the received image. The mobile electronic device 10 may perform a modeling process on the captured image, transmit the modeled image data to the server 2 or the server 5, and receive converted image data. The mobile electronic device 10 may transmit location information to the server 2 or the server 5 and receive modeled area data from the server 2 or the server 5.

In the embodiment, the location information is acquired based on the information acquired through communication with the GPS satellite 7; however, the present invention is not limited thereto. For example, the location information may be acquired based on the information acquired through communication with a base station. Even if the location information is acquired through communication with the base station, a target range can be narrowed down to a given range. By using the communication with the base station in this way, the map can be specified and the location of the destination can be accurately identified without using the GPS satellite. Although it is preferable that the communication system 1 acquires the location information and limits the target range of the map, the present invention is not limited thereto. Therefore, instead of extraction of the area data, the data for the reference map may be compared with the map image, and an area indicated by the map image may be specified. The communication system 1 may extract area data based on the information instructed by the user through text input or so.

The method of comparing the map image captured by the camera 40 with the area data and the method of specifying the map image captured by the camera 40 are not limited to the embodiment. Other examples of the method of comparing the map image with the area data and the method of specifying the map image captured by the camera 40 will be explained below with reference to FIG. 18 to FIG. 21. FIG. 18 to FIG. 21 are explanatory diagrams for explaining other examples of the operation of the mobile electronic device. The examples illustrated in FIG. 18 to FIG. 21 are also examples in a case where the map 100 illustrated in FIG. 6 is captured as the map image.

Figures 18, 19:
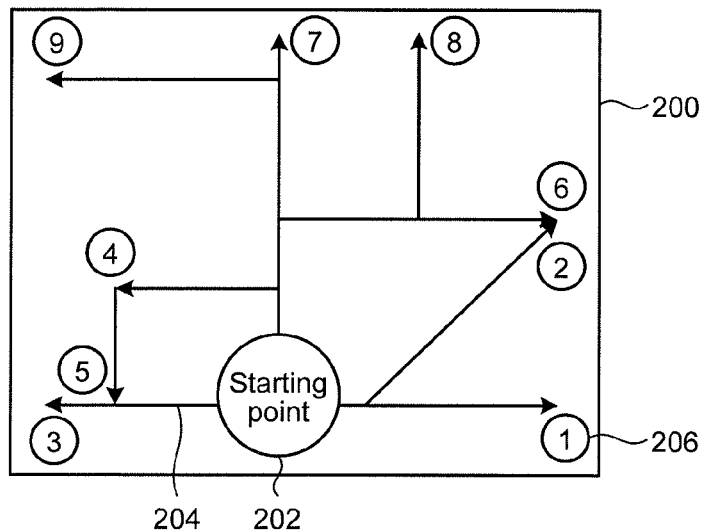
FIG. 18 is an explanatory diagram for explaining another example of the operation of the mobile electronic device.
FIG. 19 is an explanatory diagram for explaining another example of the operation of the mobile electronic device.

First of all, the mobile electronic device 10 analyzes the captured map image and extracts a road 204 as illustrated in an image 200 of FIG. 18. Subsequently, the mobile electronic device 10 extracts a point being a starting point 202 from the image 200 and extracts vector information for the road 204 based on the starting point 202. As the vector information, coordinates as a starting point of each vector, an angle, a length, a width, and information for connected other vectors are extracted. Furthermore, the mobile electronic device 10 associates pieces of vector information for the extracted road 204 with indices 206 respectively. The mobile electronic device 10 organizes the extracted pieces of vector information for each index 206 and makes a list of the vector information as illustrated in FIG. 19.

Figure 20:
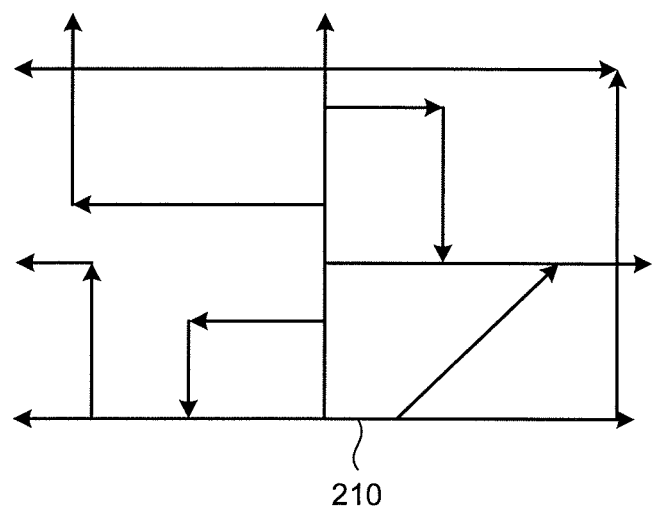
FIG. 20 is an explanatory diagram for explaining another example of the operation of the mobile electronic device.
Figure 21:
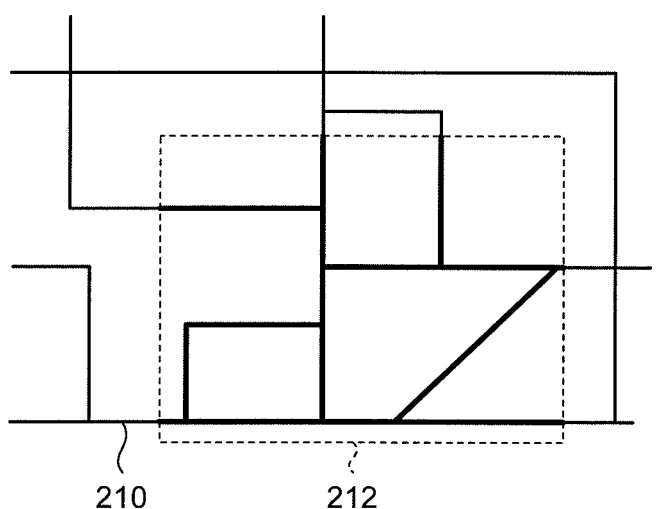
FIG. 21 is an explanatory diagram for explaining another example of the operation of the mobile electronic device.

The mobile electronic device 10 also extracts area data being a given area extracted from the data for the reference map. Then, with respect to the extracted area data, the mobile electronic device 10 extracts also a road 210 as vectors as illustrated in FIG. 20. Subsequently, the mobile electronic device 10 compares the vector information extracted from the map image in FIG. 18 with the vector information for the area data in FIG. 20. Thus, the mobile electronic device 10 can extract and specify an area 212 included in the map image based on the road 210 in the area data.

The method for comparison with the area data and the method for specifying the map image captured by the camera 40 can be configured to extract shapes of blocks each segmented by roads, compare the shapes of the blocks, and specify the position in the map image. The method for specifying the map image may also be configured to extract characters (building name, station name, place-name, and road name) included in the map image and specify the position in the map image based on the extracted name. The various methods may be combined with each other.

The communication system 1 and the mobile electronic device 10 can perform various processes as processes performed after the map image is specified. That is, the communication system 1 and the mobile electronic device 10 can create various images as an image to be displayed on the map image. For example, various images such as an image displaying a destination and an image displaying a route can be created.

When a destination is to be displayed, the destination may be extracted based on a character string included in mail as illustrated in a text 230 in FIG. 22 and a text 232 in FIG. 23. The area data can contain data for addresses in addition to coordinates, and, therefore, by using an address, the location of the destination can be specified on the map image and displayed thereon.

As for a map being a subject to be captured, maps (maps displayed on signboards) as a direction board built in stations and the like and maps printed on books such as guide books can be used. When a map printed on a book is used, a captured image is analyzed, a phone number and address information described on a page displaying the map are acquired, so that area data may be specified and a destination to be displayed as a specific image may be specified.

Figure 24:
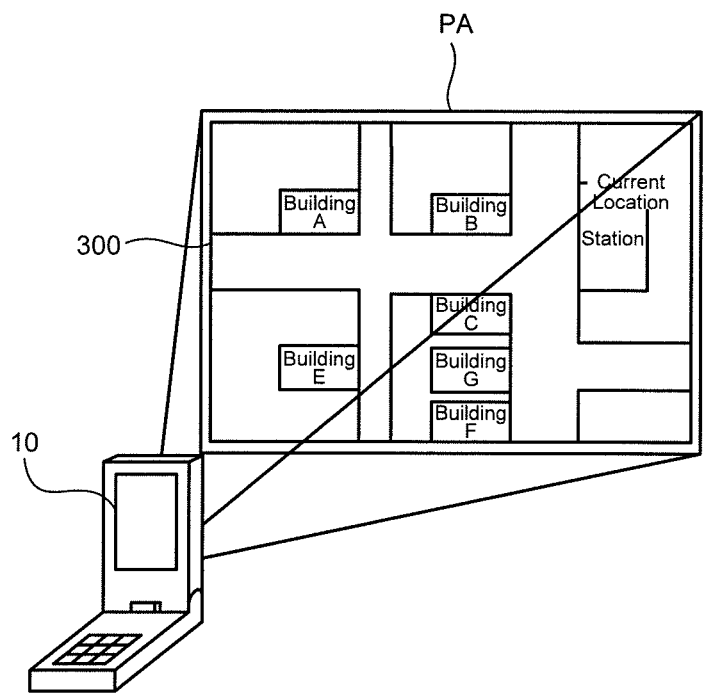
FIG. 24 is an explanatory diagram illustrating another example of the state in which an image is displayed by the projector of the mobile electronic device illustrated in FIG. 2.

Then, other examples of the operation of the mobile electronic device 10 and of the control method of the mobile electronic device 10 will be explained below with reference to FIG. 24 to FIG. 29. FIG. 24 is an explanatory diagram illustrating another example of the state in which an image is displayed by the projector of the mobile electronic device illustrated in FIG. 2. The example illustrated in FIG. 24 is a case in which an area displaying a map 300 such as a map for a direction board is set to the projection area PA. The map 300 is a map of an area different from that of the map 100.

Figure 25:
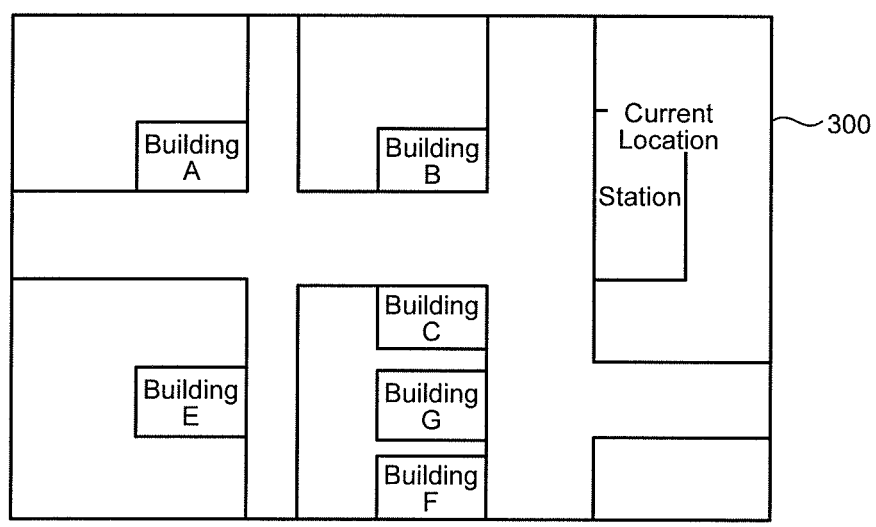
FIG. 25 is a schematic diagram illustrating an example of a map.
Figure 26:
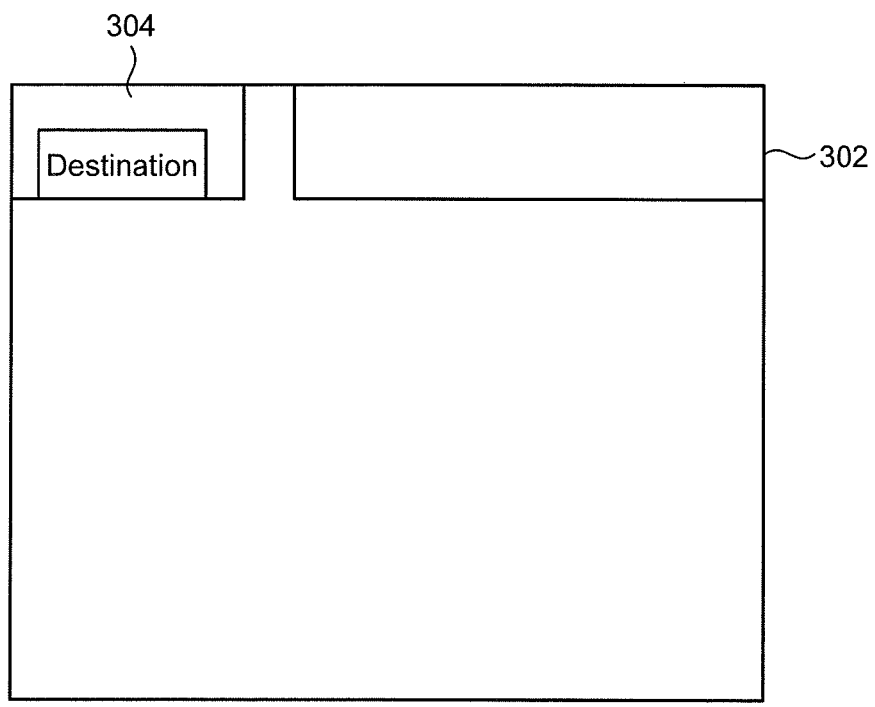
FIG. 26 is a schematic diagram illustrating an example of an image to be projected onto the map.
Figure 27:
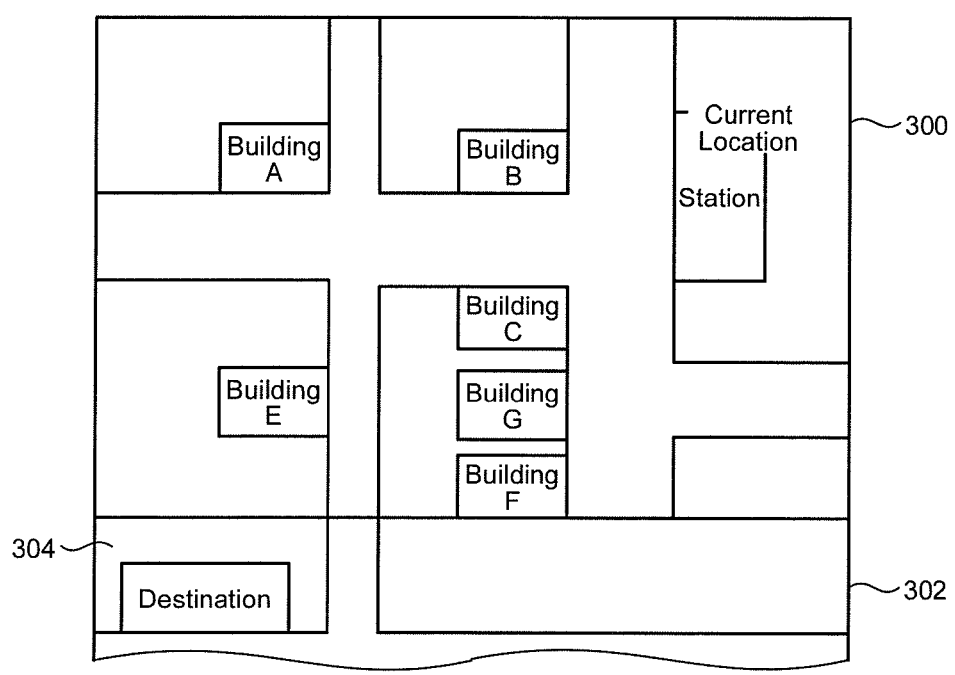
FIG. 27 is an explanatory diagram illustrating an example of a state in which the image is displayed by the projector of the mobile electronic device.

Another example of the operation of the mobile electronic device will be explained below with reference to FIG. 25 to FIG. 27. FIG. 25 is a schematic diagram illustrating an example of a map. FIG. 26 is a schematic diagram illustrating an example of an image to be projected onto the map. FIG. 27 is an explanatory diagram illustrating an example of a state in which the image is displayed by the projector of the mobile electronic device.

First of all, the mobile electronic device 10 captures and acquires the map 300 illustrated in FIG. 25 through the camera 40. When the image of the map 300 is acquired, the mobile electronic device 10 analyzes the image of the map 300 and specifies which area the captured map 300 indicates. Then, when the area indicated by the map 300 is specified, the mobile electronic device 10 acquires a specific image corresponding to the map 300. For example, a specific image 302 illustrated in FIG. 26 is an image displaying a map 304 of a lower area in the map 300. The destination is included in the map 304.

When the specific image 302 is acquired, the mobile electronic device 10 causes the projector 34 to project the acquired specific image 302 on the map 300, as illustrated in FIG. 27, so that at least part of the specific image is superimposed on the map 300 or the specific image is contiguous to the map 300. As a result, the map 304 of the area not displayed in the map 300 can be connected to the map 300 for display.

By performing the same processes as these of FIG. 9, the mobile electronic device 10 can display (project) the specific image 302. That is, by adjusting settings and conditions, the mobile electronic device 10 can display (project) the specific image 302 through the processes the same as the processes for displaying the specific image 102. When the coordinate conversion table is created at Step S24, then at Step S26, the processing unit 22 performs the converting process. At this time, the processing unit 22 also converts information for roads required to display a subject at coordinates not included in the map image from coordinates in the area data to coordinates in the map image.

When the converting process is performed at Step S26, then at Step S28, the processing unit 22 determines whether the projector 34 projects the image to the map, i.e. whether the projector 34 projects the image onto the map to be captured or projects the image next to the map. When it is determined that it is projected to the map at Step S28 (Yes at Step S28), then at Step S30, the processing unit 22 creates a projection image. In other words, the processing unit 22 performs creates an image, as the projection image, (i.e. an image that can be combined with the map for display) to be displayed so that part of the image is superimposed on the map or the image is next to the map, based on the image generated through performing the converting process at Step S26. At Step S32, the processing unit 22 causes, for example, the projector 34 to project a map image of an area not included in the map so as to be next to the map. Examples of the composite image according to the present embodiment include an image in which the map image captured by the camera 40 is combined with an image, created at Step S26, of an area not included in the map image.

The communication system 1 and the mobile electronic device 10 are configured to display an image, as a specific image, obtained by converting a map of an area not displayed according to the display rule of the map captured by the camera 40 on the map captured by the camera 40. In this way, the data for the reference map can be processed corresponding to the map image captured by the camera 40, and therefore a converted image in accordance with to the display rule (scale, the degree of abstraction) of the map image captured by the camera 40 can be created. This allows an easy-to-see and easy-to-understand image even when the map image not included in the map captured by the camera 40 is next to the map. In other words, the map of a spot not included in the map image captured by the camera 40 can be displayed based on the display rule matching the map image captured by the camera 40, and therefore the location of the destination can be also easily and accurately recognized.

The communication system 1 and the mobile electronic device 10 cause the projector 34 to project an image to the map of which image is captured, so that information or so of the destination can be displayed on a largely displayed map or on a map currently visually recognized by the user. Map information for an area not included in the map whose image is captured can be also checked. Moreover, the communication system 1 and the mobile electronic device 10 display an image in which a converted image is superimposed on the captured map on the display unit 32, so that the map and the destination can be checked even at a location away from the place where the map is captured. In this case, also, the destination and the current location can be checked by the image using the map (captured map image) that has been once checked. Therefore, the user can easily recognize the map.

Figure 28:
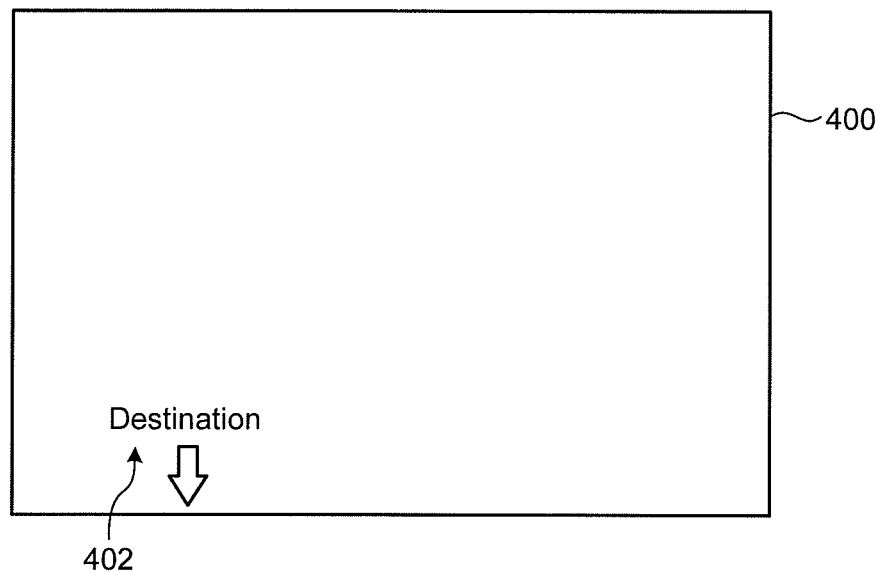
FIG. 28 is a schematic diagram illustrating another example of the image to be projected onto the map.
Figure 29:
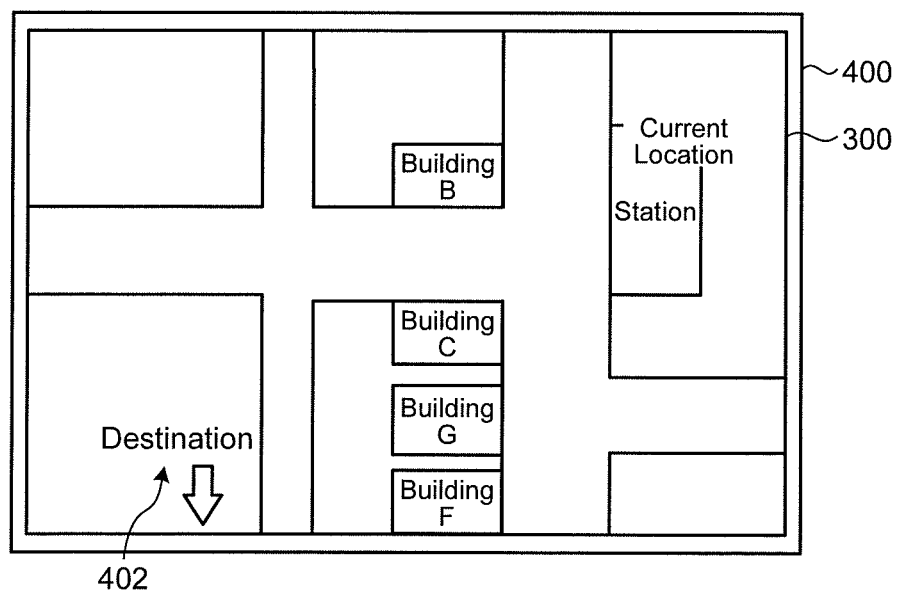
FIG. 29 is an explanatory diagram illustrating another example of the state in which the image is displayed by the projector of the mobile electronic device.

The communication system 1 and the mobile electronic device 10 do not have to create, display, and project a map, as a specific image, of an area not displayed in the map captured by the camera 40. The communication system 1 and the mobile electronic device 10 simply display and project an image, as a specific image, indicating information related to a spot in an area not displayed in the map captured by the camera 40. FIG. 28 is a schematic diagram illustrating another example of the image to be projected onto the map, and FIG. 29 is an explanatory diagram illustrating another example of the state in which the image is displayed by the projector of the mobile electronic device. FIG. 28 and FIG. 29 represent a case in which the map is displayed or projected in order to know the location of the destination. The communication system 1 and the mobile electronic device 10 may create an image 400 including a marker 402 being a specific image as illustrated in FIG. 28. The marker 402 is formed of a text and a sign indicating in which direction in the area not included in the captured map the destination is located. As illustrated in FIG. 29, the communication system 1 and the mobile electronic device 10 display the created specific image 400 superimposed on the map 300, so that it is recognized that the destination is located at the end of which street on the map 300. The display method may be implemented by causing the projector 34 to project the specific image 400 onto the map 300 or by displaying the image with the specific image 400 and the map 300 superimposed on each other on the display unit 32. The marker 402 is displayed in FIG. 28 and FIG. 29 in order to indicate the destination in the area of the map 300; however, the type of the marker 402 is not limited thereto. Other required pieces of information may be displayed in the area of the map 300.

As for a map to be captured, maps (maps displayed on signboards) as a direction board built in stations and the like and maps printed on books such as guide books can be used. When a map printed on a book is used, a captured image is analyzed, a phone number and address information described on a page displaying the map are acquired, so that area data may be specified and a destination to be displayed as a specific image may be specified.

Figure 30:
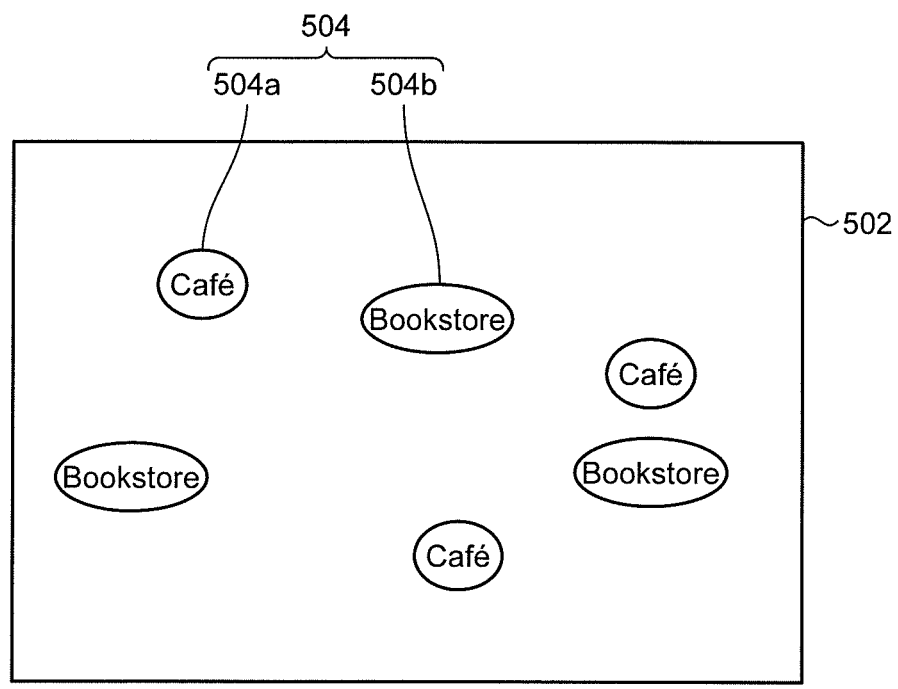
FIG. 30 is a schematic diagram illustrating an example of an image to be projected onto the map.
Figure 31:
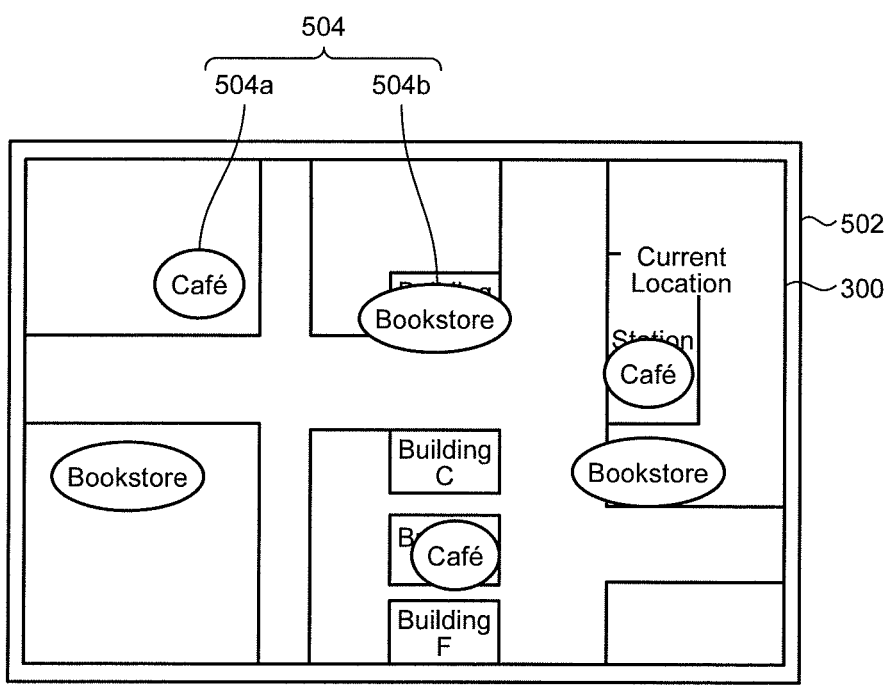
FIG. 31 is an explanatory diagram illustrating an example of a state in which the image is displayed by the projector of the mobile electronic device.
Figure 32:
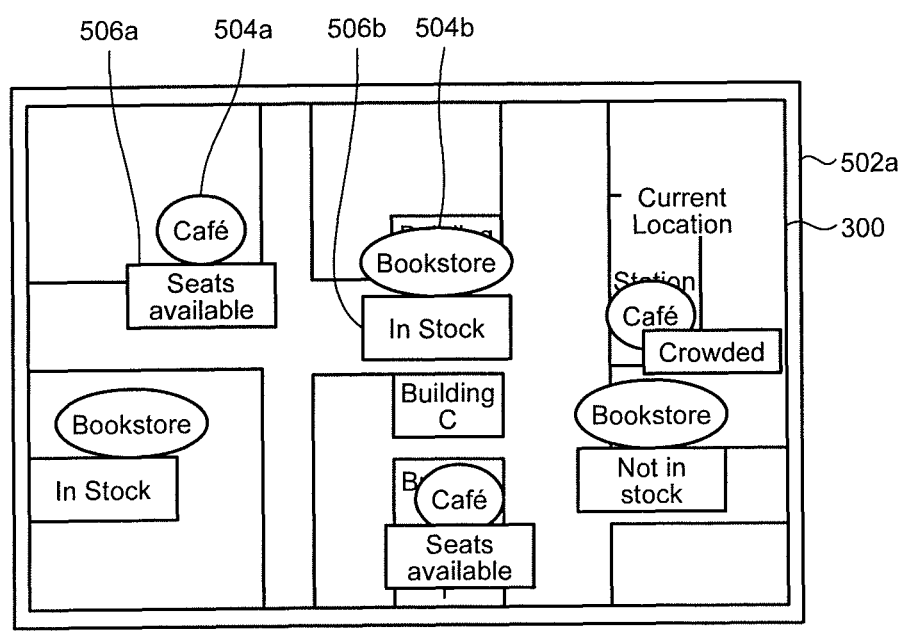
FIG. 32 is an explanatory diagram illustrating another example of the state in which the image is displayed by the projector of the mobile electronic device.

Then, another operation of the mobile electronic device will be explained below with reference to FIG. 30 to FIG. 32. FIG. 30 is a schematic diagram illustrating an example of an image to be projected onto the map. FIG. 31 is an explanatory diagram illustrating an example of a state in which the image is displayed by the projector of the mobile electronic device. FIG. 32 is an explanatory diagram illustrating another example of the state in which the image is displayed by the projector of the mobile electronic device. In the examples illustrated in FIG. 30 to FIG. 32, the map 300 is an object to be processed similarly to the examples illustrated in FIG. 24 to FIG. 29.

First of all, the mobile electronic device 10 captures and acquires the map 300 illustrated in FIG. 25 through the camera 40. When the image of the map 300 is acquired, the mobile electronic device 10 analyzes the image of the map 300 and specifies which area the captured map 300 indicates. Then, when the area indicated by the map 300 is specified, the mobile electronic device 10 acquires a specific image corresponding to the map 300. For example, a specific image 502 illustrated in FIG. 30 is an image displaying markers 504. The markers 504 include a marker 504a indicating positions of cafés and a marker 504b indicating positions of bookstores on the map 300. Information as to at which positions on the map 300 the cafés and bookstores are located is stored in the database 4, which will be explained later, and the mobile electronic device 10 acquires these pieces of information from the database 4 through the communication unit 26, the short-range communication unit 36, the server 2, or the server 5.

As illustrated in FIG. 31, when the specific image 502 is acquired, the mobile electronic device 10 causes the projector 34 to project the acquired specific image 502 to the map 300 on top thereof. This enables the marker 504 to be displayed on the map 300, so that it is possible to display at which positions on the map the cafés and the bookstores are located.

The mobile electronic device 10 may display a specific image 502a, illustrated in FIG. 32, having an amount of information more than that of the specific image 502 illustrated in FIG. 30 and FIG. 31. The specific image 502a displays pieces of additional information 506a and 506b in addition to the markers 504a and 504b. The additional information 506a is information indicating whether there is a vacant seat in the café, and the additional information 506b is information indicating whether the bookstore has a predetermined book in stock. These pieces of the additional information 506a and 506b are stored in the externally provided database 4 together with the information for the markers 504. A book being an object of the additional information 506b may be a book input by the user or may be a book retrieved based on arbitrarily set conditions. The mobile electronic device 10 displays the specific image 502a in the map 300 on top thereof, and this enables the user to learn about whether there is a vacant seat in each café or whether bookstores have a target book in stock in addition to the information as to where there are cafés and bookstores.

The mobile electronic device 10 can display (project) the specific image 502 by performing the processes the same as the processes of FIG. 9. That is, the mobile electronic device 10 can display (project) the specific image 502 through the processes the same as the processes for displaying the specific image 102 by adjusting the settings and conditions.

As explained above, when the coordinate conversion table is created at Step S24, then at Step S26, the processing unit 22 performs the converting process. In the case of the present embodiment, the processing unit 22 extracts information associated with an area included in the map image from the database 4 through the communication unit 26, the server 2, or the server 5. At this time, the processing unit 22 searches for information based on search criteria preset or input by the user and extracts required information from the database 4. In the present embodiment, the information for a spot being a landmark along the route to the destination A is an object to be searched, and the landmark A and the landmark B are extracted through the search. The information for the destination A is also extracted. Thereafter, as illustrated in the list of FIG. 17, the processing unit 22 converts the coordinates of the extracted predetermined object (target spot) to the coordinates in the map image.

The communication system 1 and the mobile electronic device 10 according to the present embodiment acquire predetermined information for an area included in the map captured by the camera 40 and display a converted image as a specific image. In this way, by acquiring the information for an area included in the map and displaying the information as an image, the information, in the area included in the map, required for the user can be unfailingly displayed on the map. For example, in the examples illustrated in FIG. 30 to FIG. 32, the user can accurately know the locations of cafés and bookstores within the area included in the map.

By extracting information from the externally provided database 4 based on the predetermined search criteria, real time information updated as necessary can be acquired. In other words, the communication system 1 and the mobile electronic device 10 preferably extract information required for creation of a specific image from the externally provided database 4 that updates information. This enables the communication system 1 and the mobile electronic device 10 to display the image as illustrated in FIG. 32, so that the user can accurately know whether there is any café the user can drop in right now and whether there is a stock of the desired book, or the like. Thereby, there is no need for the user to enter every one of shops to check a desired condition, thus the user can previously know required information.

The communication system 1 and the mobile electronic device 10 can select and display required information on the map. Therefore, it is possible to reduce the time required for determination of information due to too much information on the map, thus the user can effectively know required information in a short time.

The data for the reference map can be converted in accordance with the map image captured by the camera 40, and therefore a converted image in accordance with the display rule (scale, the degree of abstraction) of the map image captured by the camera 40 can be created. This allows an easy-to-see and easy-to-understand image even when the image is superimposed on the map captured by the camera 40.

A method of filtering (i.e. a method of extracting, a method of searching) information in order that the communication system 1 and the mobile electronic device 10 create a specific image is not particularly limited, and therefore various methods can be used. The information (particularly additional information) extracted by filtering and displayed is not limited to shop information (information for a shop that matches the search criteria), a stock status (whether there is a particular object), and a congestion state (whether there are vacant seats). For example, information related to the time may be displayed, shop hours of an extracted shop may be displayed, or only a shop that opens at the current time may be extracted and displayed. Information related to a distance i.e. a distance from the current location to the shop and the amount of time required to reach it on foot may be displayed. In this case, it is necessary to input or acquire information for the current location. In addition, information as to whether there is any shop where contracted electronic money can be used may be displayed, or only shops where contracted electronic money can be used may be extracted and displayed. Moreover, when the congestion state of a shop is to be displayed, a waiting time may be displayed in addition to or instead of information on whether there are vacant seats. In addition, only the shop that the user has dropped in in the past may be displayed, or only a shop that the user has never dropped in may be displayed using a use history of the electronic money. These pieces of information can be extracted by using the information stored in the storage unit 24 and in the external storage unit 25, or by using the search criteria entered the data stored in the database 4, the storage unit 24, and the external storage unit 25.

The mobile electronic device 10 can appropriately display latest information as explained above, and is therefore preferable to acquire information for an area included in the map image for use in creation of a specific image from the externally provided database 4. However, the present invention is not limited thereto, and the mobile electronic device 10 may acquire information for an area included in the map image from the data stored in the storage unit 24 and the external storage unit 25 in the mobile electronic device 10. In this case, also, required information can be selectively displayed, thus effectively using the map image.

As for a map to be captured, maps (maps displayed on signboards) as a direction board built in stations and the like and maps printed on books such as guide books can be used. When a map printed on a book is used, a captured image is analyzed, a phone number and address information described on a page displaying the map are acquired, so that area data may be specified and a destination to be displayed as a specific image may be specified.

The invention claimed is:

1. A mobile electronic device, comprising:
    an imaging unit configured to capture a map image of a map;
    a processing unit configured to
        extract roads from the map image,
        extract first vector information of the roads,
        extract area data corresponding to the map,
        extract second vector information of roads from the area data,
        compare the first vector information with the second vector information, and
        acquire information for a specific image corresponding to the map image based on a result of comparing the first vector information with the second vector information;
    an image projecting unit configured to project the specific image onto the map; and
    a display unit configured to display both the specific image and the map image.

2. The mobile electronic device according to claim 1, wherein the processing unit is configured to
    acquire an image, as the specific image, to be combined with the map image, and
    cause the image projecting unit to project the specific image.

3. The mobile electronic device according to claim 1, wherein
    the processing unit is configured to
        acquire an image, as the specific image, to be combined with the map image, and
        cause the display unit to display the specific image and the map image captured by the imaging unit in combination with each other.

4. The mobile electronic device according to claim 1, wherein
    the specific image includes an image created by
        associating location information in the map image with location information in data for a reference map, and
        associating information included in the data for the reference map with coordinates in the map image.

5. The mobile electronic device according to claim 4, further comprising:
    a location-information acquiring unit configured to acquire location information of the mobile electronic device, wherein
    the processing unit is configured to determine a range of data for the reference map to be compared with the map image based on the location information of the mobile electronic device acquired by the location-information acquiring unit.

6. The mobile electronic device according to claim 4, wherein
    the specific image includes an image obtained by converting coordinates in the data for the reference map into coordinates in the map image in association with each other.

7. The mobile electronic device according to claim 4, wherein
    the processing unit is configured to
        analyze the map image to specify an absolute position, by comparing elements included in the map image with corresponding elements of the reference map, and
        acquire the specific image corresponding to the absolute position, and the elements include
        indices assigned to all feature points included in the map image,
        a number of branches at each of the feature points, and
        the indices of said feature points being connected to a relevant index.

8. The mobile electronic device according to claim 4, wherein
    the processing unit is configured to
        analyze the map image to specify an absolute position, by comparing elements included in the map image with corresponding elements of the reference map, and
        acquire the specific image corresponding to the absolute position, and the elements include
        a starting point as a reference point included in the map image,
        indices assigned to all roads in the map image, and
        vector information of each of the roads based on the reference point.

9. The mobile electronic device according to claim 8, wherein
    the vector information includes coordinates as a starting point of each vector, an angle, a length, and information for other connected vectors.

10. The mobile electronic device according to claim 1, wherein the specific image includes information for a spot outside an area of the map image.

11. The mobile electronic device according to claim 10, wherein
the specific image includes a map of a location outside the area of the map image.

12. The mobile electronic device according to claim 10, wherein
the specific image includes a marker indicating a direction to a specific spot outside the area of the map image.

13. The mobile electronic device according to claim 1, wherein
the processing unit is configured to
specify a position indicated by the map image captured by the imaging unit,
acquire related information related to the specified position, and
acquire the information for the specific image obtained by arranging the related information in a corresponding position of the map image.

14. The mobile electronic device according to claim 13, wherein
the related information is extracted based on search criteria from information associated with the map image.

15. The mobile electronic device according to claim 13, further comprising:
an information acquiring unit configured to perform communication with an external device to acquire the related information, wherein
the processing unit is configured to acquire the related information through the information acquiring unit.

16. The mobile electronic device according to claim 15, wherein
the information acquiring unit is configured to acquire the related information from a database in which information is updated.

17. The mobile electronic device according to claim 1, further comprising:
a communication unit configured to perform communication with a communication device, wherein
the processing unit is configured to
output the map image to the communication device through the communication unit, and
acquire the specific image from the communication device.

18. The mobile electronic device according to claim 1, further comprising:
a communication unit configured to perform communication with a communication device, wherein
the processing unit is configured to
specify a position indicated by the map image captured by the imaging unit,
output information for the position to the communication device through the communication unit, and
acquire the specific image from the communication device.

19. The mobile electronic device according to claim 1, wherein
the information for the specific image, which is included in the map image, is sufficient only for images of roads in said map image.

20. A control method of a mobile electric device having a display unit, an imaging unit and an image projecting unit, the control method comprising:
capturing, by the imaging unit, a map in an imaging area of the imaging unit to acquire a map image of the map;
extracting roads from the map image;
extracting first vector information of the roads;
extracting area data corresponding to the map;
extracting second vector information of roads from the area data;
comparing the first vector information with the second vector information;
acquiring information for a specific image corresponding to the map image based on a result of said comparing the first vector information with the second vector information;
projecting, by the image projecting unit, the specific image onto the map; and
displaying, by the display unit, both the specific image and the map image.

21. The control method according to claim 20, wherein
the projecting includes
checking a position of the map using the imaging unit, and
correcting a projection position of the specific image so that the map and the projected specific image are combined with each other.

22. A mobile electronic device, comprising:
an imaging unit configured to capture a map image of a map;
a processing unit configured to
extract roads from the map image,
extract first vector information of the roads,
extract area data corresponding to the map,
extract second vector information of roads from the area data,
compare the first vector information with the second vector information, and
acquire information for a specific image corresponding to the map image based on a result of comparing the first vector information with the second vector information; and
an image projecting unit configured to project the specific image onto the map,
wherein
the specific image includes information for a spot outside an area of the map image, and
the information for the spot outside the area of the map image is projected in a region outside the map.

23. A mobile electronic device, comprising:
an imaging unit configured to capture a map image of a map;
a processing unit configured to
extract roads from the map image,
extract feature points from the roads,
perform modeling on the feature points and acquire first modeling data,
extract area data corresponding to the map,
perform modeling on the area data and acquire second modeling data,
compare the first modeling data with the second modeling data,
create a coordinate conversion table from a result of comparison of the first modeling data to the second modeling data,
convert coordinates of the area data to coordinates of the map image based on the coordinate conversion table, and
acquire information for a specific image corresponding to the map image based on a result of converting the coordinates of the area data to the coordinates of the map image;

an image projecting unit configured to project the specific image onto the map; and a display unit configured to display both the specific image and the map image.

* * * * *